United States Patent Office 3,303,185
Patented Feb. 7, 1967

3,303,185
BIS(6-ACYLPENICILLANYL)DISULFIDES
Robert R. Fraser, Syracuse, N.Y., assignor to Bristol-Myers Company, New York, N.Y., a corporation of Delaware
No Drawing. Filed Dec. 16, 1963, Ser. No. 330,600
20 Claims. (Cl. 260—239.1)

This invention relates to new synthetic compounds of value as antibacterial agents, as nutritional supplements in animal feeds, as agents for the treatment of mastitis in cattle and as therapeutic agents in poultry and animals, including man, in the treatment especially of infectious diseases caused by Gram-positive bacteria. More particularly, this invention relates to bis(6-acylpenicillanyl)-disulfides and salts thereof.

Antibacterial agents such as benzylpenicillin have proved highly effective in the past in the therapy of infections due to Gram-positive bacteria, but such agents suffer from the serious drawbacks of being unstable in aqueous acid, e.g., upon oral administration, and of being ineffective against numerous so-called resistant strains of bacteria.

It is the object of the present invention to provide compounds useful in the treatment of infections caused by Gram-positive bacteria, including particularly resistant strains of bacteria, e.g., benzylpenicillin-resistant strains of *Staphylococcus aureus* (*Micrococcus pyogenes* var. *aureus*). It is a further object of the present invention, to provide compounds which, in addition to their potent antibacterial activity, exhibit resistance to destruction by acid.

The objects of the present invention have been achieved by the provision of a member selected from the group consisting of disulfides having the formula (I)

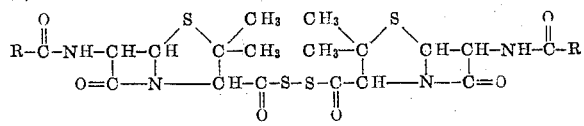

hereafter, for simplicity, written as (I)

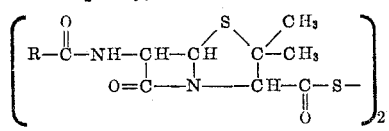

and the pharmaceutically acceptable nontoxic salts thereof, wherein R is a member selected from the group consisting of
A. Radicals having the formula (II)

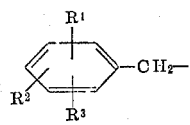

wherein $R^1$, $R^2$ and $R^3$ are each a member selected from the group consisting of hydrogen, chloro, bromo, fluoro, iodo, nitro, sulfamyl, trifluoromethyl, (lower)alkyl, (lower)alkoxy, (lower)alkylthio, di(lower)alkylamino, (lower)alkanoylamino, (lower)alkanoyl, (lower)alkylsulfonyl, cycloalkyl radicals having from 5 to 7 carbon atoms inclusive, cycloalkoxy radicals having from 5 to 7 carbon atoms inclusive, phenyl, phenoxy and benzyl;

B. Radicals having the formula (V)

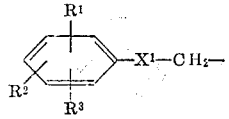

wherein $R^1$, $R^2$ and $R^3$ are each a member selected from the group consisting of hydrogen, chloro, bromo, fluoro, iodo, nitro, sulfamyl, trifluoromethyl, (lower)alkyl, (lower)alkoxy, (lower)alkylthio, di(lower)alkylamino, (lower)alkanoylamino, (lower)alkanoyl, (lower)alkylsulfonyl, cycloalkyl radicals having from 5 to 7 carbon atoms inclusive, cycloalkoxy radicals having from 5 to 7 carbon atoms inclusive, phenyl, phenoxy and benzyl and wherein $X^1$ is a member selected from the group consisting of sulfur and oxygen, C. Radicals having the formula (VIII)

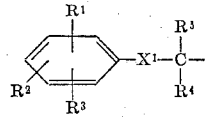

wherein $R^1$, $R^2$ and $R^3$ are each a member selected from the group consisting of hydrogen, chloro, bromo, fluoro, iodo, nitro, sulfamyl, trifluoromethyl, (lower)alkyl, (lower)alkoxy, (lower)alkylthio, di(lower)alkylamino, (lower)alkanoylamino, (lower)alkanoyl, (lower)alkylsulfonyl, cycloalkyl radicals having from 5 to 7 carbon atoms inclusive, cycloalkoxy radicals having from 5 to 7 carbon atoms inclusive, phenyl, phenoxy and benzyl, wherein $X^1$ is a member selected from the group consisting of sulfur and oxygen, and wherein $R^4$ is a member selected from the group consisting of (lower)alkyl, phenyl and phenyl(lower)alkyl, and wherein $R^5$ represents hydrogen, (lower)alkyl, phenyl and phenyl(lower)alkyl;

D. Radicals having the formula (XI)

wherein Z is a member selected from the group consisting of radicals of the formulae (XII)

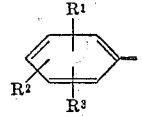

(XIII)

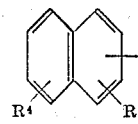

(XIV)

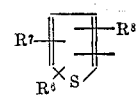

wherein $R^1$, $R^2$ and $R^3$ are each a member selected from the group consisting of hydrogen, chloro, bromo, fluoro, iodo, nitro, sulfamyl, trifluoromethyl, (lower)alkyl, (lower)alkoxy, (lower)alkylthio, di(lower)alkylamino, (lower)alkanoylamino, (lower)alkanoyl, (lower)alkanoyloxy, (lower)alkylsulfonyl, phenyl and benzyl, wherein $R^4$ and $R^5$ are each a member selected from the group consisting of hydrogen, chloro, bromo, fluoro, iodo, nitro, (lower)alkoxy, phenoxy, benzyloxy, trifluoromethyl, (lower)alkanoylamino and (lower)alkyl, and wherein $R^6$, $R^7$ and $R^8$ are each a member selected from the group consisting of hydrogen, chloro, bromo, fluoro, iodo, nitro, (lower)alkyl, (lower)alkoxy, phenyl, phenoxy, benzyloxy, (lower)alkylthio, di(lower)alkylamino, (lower)alkanoylamino, (lower)alkanoyl, and (lower)alkylsulfonyl, E. Radicals having the formula (XV)

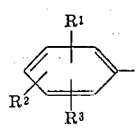

wherein $R^1$, $R^2$ and $R^3$ are each a member selected from the group consisting of hydrogen, chloro, bromo, fluoro, iodo, nitro, sulfamyl, trifluoromethyl, (lower)alkyl, (lower)alkoxy, (lower)alkylthio, di(lower)alkylamino, (lower)alkanoylamino, (lower)alkanoyl, (lower)alkylsulfonyl, cycloalkyl radicals having from 5 to 7 carbon atoms inclusive, cycloalkoxy radicals having from 5 to 7 carbon atoms inclusive, phenyl, phenoxy and benzyl;

F. Radicals having the formula (XIX)

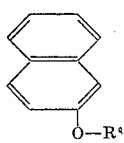

wherein $R^8$ is (lower)alkyl;

G. Radicals having the formula (XX)

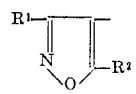

wherein $R^1$ and $R^2$ are each a member selected from the group consisting of (lower)alkyl, (lower)alkoxy, (lower)alkylthio, cyclopentyl, cyclohexyl, benzyl, phenoxy and radicals of the formula

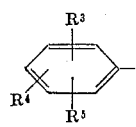

wherein $R^3$, $R^4$ and $R^5$ are each a member selected from the group consisting of hydrogen, chloro, bromo, fluoro, iodo, nitro, cyano, (lower)alkyl, (lower)alkoxy, (lower)alkylthio, di(lower)alkylamino, (lower)alkanoylamino, (lower)alkanoyl, (lower)alkylsulfonyl, phenyl, benzyl, phenethyl and trifluoromethyl;

H. Radicals having the formula (XXIII)          Z—NH— wherein Z represents a member selected from the group consisting of (lower)alkyl, cycloalkyl radicals having from 5 to 7 carbon atoms inclusive, and radicals of the formulae (XXIV)

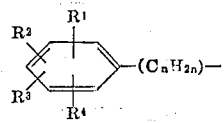

and (XXV)

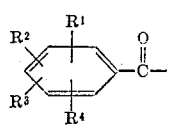

wherein $n$ is a whole integer from 0 to 6 inclusive, wherein $R^1$, $R^2$, $R^3$ and $R^4$ are each a member selected from the group consisting of hydrogen, chloro, bromo, fluoro, iodo, nitro, sulfamyl, trifluoromethyl, (lower)alkyl, (lower)alkoxy, (lower)alkylthio, di(lower)alkylamino, (lower)-alkanoylamino, (lower)alkanoyl, (lower)alkylsulfonyl, cycloalkyl radicals having from 5 to 7 carbon atoms inclusive, cycloalkoxy radicals having from 5 to 7 carbon atoms inclusive, phenyl, phenoxy and benzyl.

Thus when the above radicals are substituted for R in Formula I, the compounds of the invention correspond to the formulae (XXVIII)

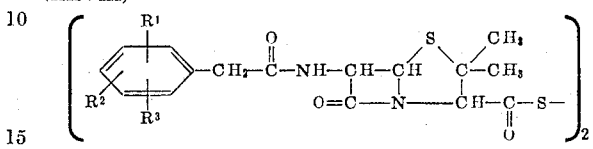

(XXIX)

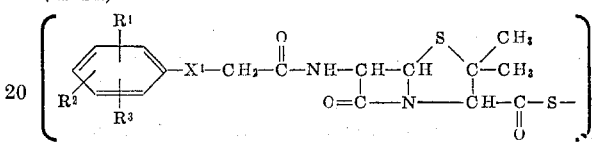

(XXX)

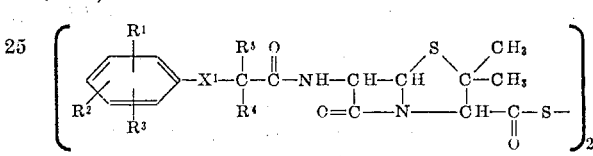

(XXXI)

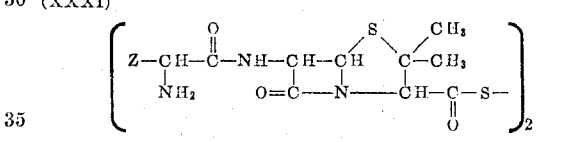

(XXXII)

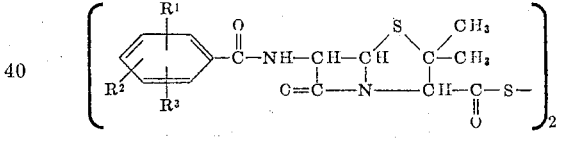

(XXXIII)

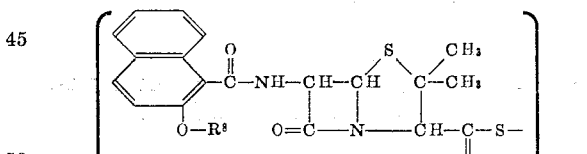

(XXXIV)

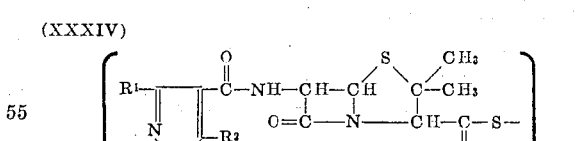

(XXXV)

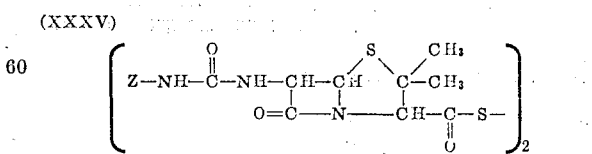

wherein the substituents in each case are as represented above.

The pharmaceutically acceptable nontoxic acid addition salts are the amine salts of compounds corresponding to Formula XXXI above. Representative of the salts are the mineral acid addition salts such as the hydrochloride, hydrobromide, hydroiodide, sulfonate, sulfate, sulfamate and phosphate; and the organic acid addition salts such as the maleate, acetate, citrate, oxalate, succinate, benzoate, tartrate, fumarate, malate, mandelate, ascorbate and the like.

The term "(lower)alkyl" as used herein means both straight and branched chain aliphatic hydrocarbon radicals having from 1 to 10 carbon atoms such as methyl, ethyl, propyl, isopropyl, butyl, isobutyl, t-butyl, amyl, hexyl, etc. Similarly, where the term "(lower)" is used as part of the description of another group, e.g., "(lower)alkoxy," it refers to the alkyl portion of such group which is therefore as described above in connection with "(lower)alkyl." To illustrate groups including (lower)alkyl groups, it is pointed out that (lower)alkoxy includes such radicals as methoxy, ethoxy, isopropoxy, etc.; (lower)alkanoyl includes acetyl, propionyl, butyryl, etc.; (lower)alkylsulfonyl includes methylsulfonyl, ethylsulfonyl, hexylsulfonyl, etc.; di(lower)alkylamino includes dimethylamino, diethylamino, ethylmethylamino, etc.

The α-carbon atom of the acyl group in Formula XXXI (to which the NH$_2$— group is attached) is an asymmetric carbon atom. Likewise, the α-carbon atom of the acyl group in Formula XXX (to which the R$^4$ and R$^5$ groups are attached) is an asymmetric carbon atom when R$^4$ and R$^5$ are different. Therefore, the compounds of Formulae XXX and XXXI can exist in two optically active isomeric forms (the D- and L-diastereoisomers) as well as in a mixture of the two optically active forms; all such isomeric forms of the compounds are included within the scope of the present invention.

It should be noted in connection with the foregoing consideration of the diastereoisomers of this invention that many isomers other than the two caused by the asymmetric carbon of the side chain are possible due to the presence of asymmetric carbon atoms in the 6-aminopenicillanic acid nucleus. Such additional isomers, however, are not presently significant since 6-aminopenicillanic acid which is the product of fermentation processes is consistently of one configuration, and such 6-aminopenicillanic acid is presently used in the production of the compounds of this invention.

A preferred group of compounds of the present invention are those corresponding to the following formulae (XXXVI)

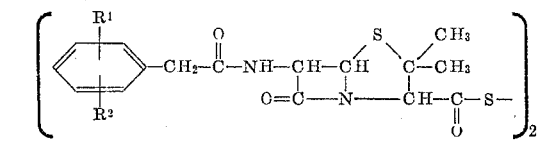

(XXXVII)

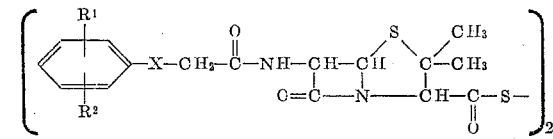

(XXXVIII)

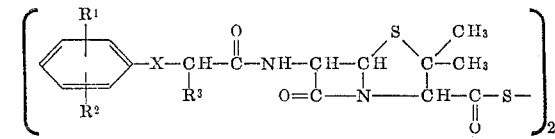

(XXXIX)

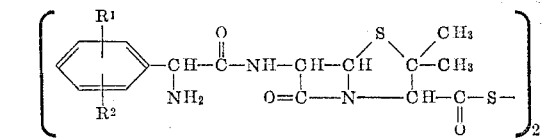

(XL)

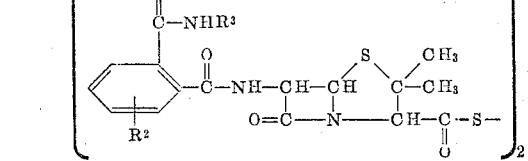

(XLI)

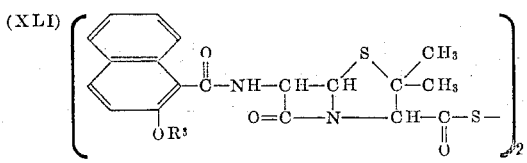

(XLII)

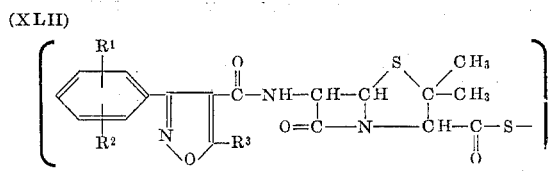

(XLIII)

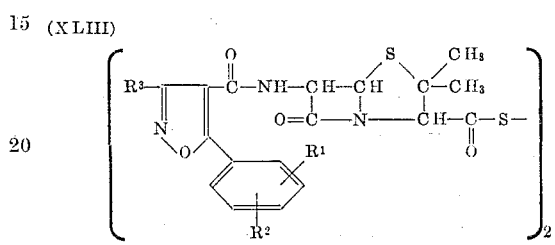

(XLIV)

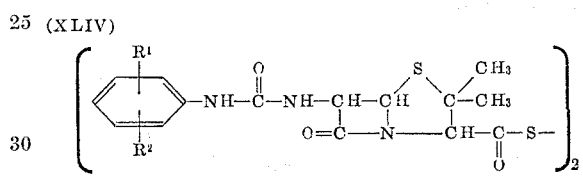

(XLV)

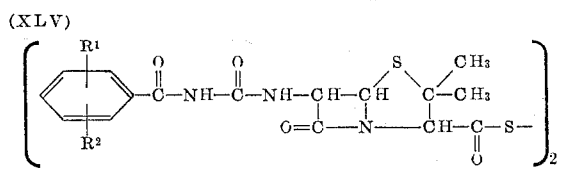

wherein R$^1$ and R$^2$ are each hydrogen, chloro, bromo, iodo, trifluoromethyl, phenyl, nitro, (lower)alkyl or (lower)alkoxy; wherein R$^3$ is (lower)alkyl; and wherein X is sulfur and oxygen.

Preferred individual compounds of the present invention are those having the following formulae (XLVI)

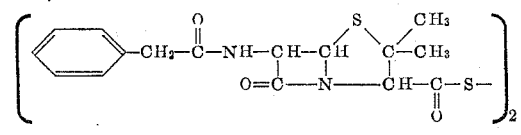

bis(6-phenylacetamidopenicillanyl) disulfide;

(XLVII)

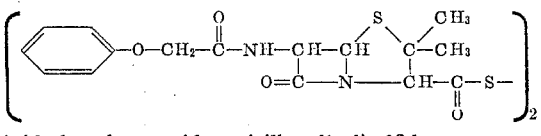

bis(6-phenylacetamidopenicillanyl) disulfide;

(XLVIII)

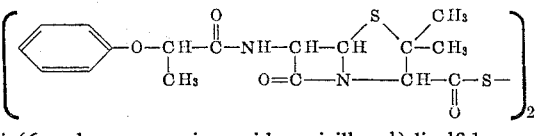

bis(6-α-phenoxypropionamidopenicillanyl)disulfide;

(XLIX)

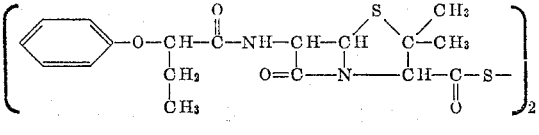

bis(6-α-phenoxy-n-butyramidopenicillanyl)disulfide;

(L)
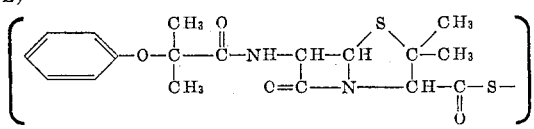
bis(6-α-phenoxy-t-butyramidopenicillanyl)disulfide;

(LI)
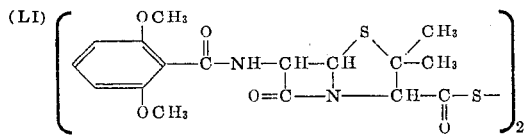
bis(6-2,6-dimethoxybenzamidopenicillanyl)disulfide;

(LII)
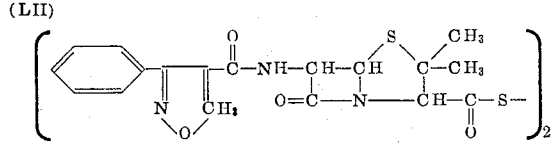
bis(6-3 - phenyl - 5 - methyl-4-isoxazolylcarboxamido-penicillanyl)disulfide;

(LIII)
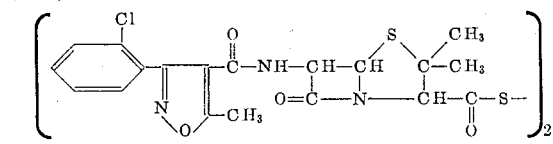
bis[6 - 3 - (o-chlorophenyl)-5-methyl-4-isoxazolylcarboxamidopenicillanyl]disulfide;

(LIV)
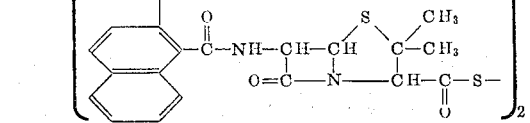
bis(6-2-ethoxy-1-naphthamidopencillanyl)disulfide;

(LV)
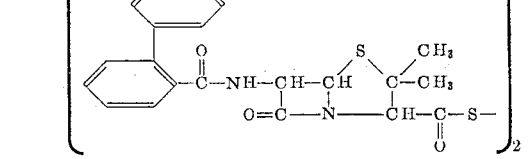
bis(6-2-biphenylcarboxamidopenicillanyl)disulfide;

(LVI)
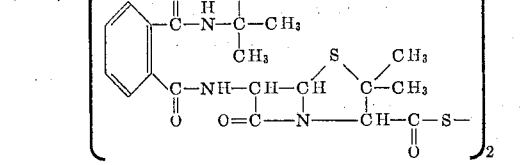
bis[6-2-(N-t-butylphthalamido)penicillanyl]disulfide;

(LVII)
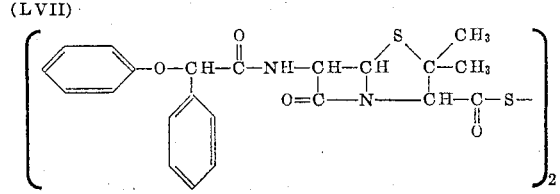
bis(6 - α - phenoxy - α - phenylacetamidopenicillanyl) disulfide;

(LVIII)
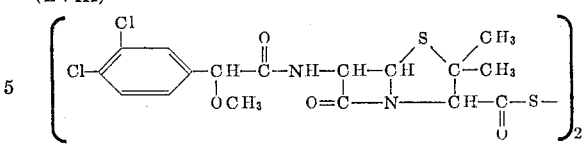
bis(6 - α - (3,4 - dichlorophenyl)-α-methoxyacetamido-pencillanyl]disulfide;

(LIX)
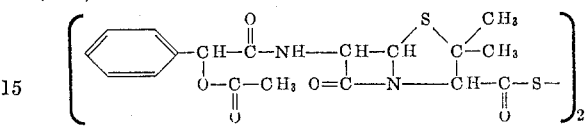
bis(6 - α-phenyl-α-acetoxyacetamidopenicillanyl)disulfide;

(LX)
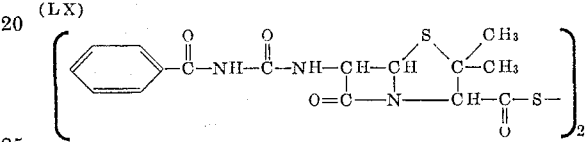
bis(6-benzoylureidopenicillanyl)disulfide;

(LXI)
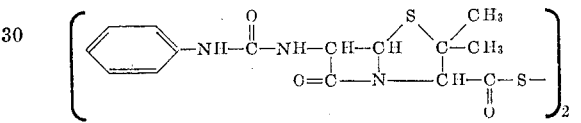
bis(6-phenylureidopenicillanyl)disulfide;

(LXII)
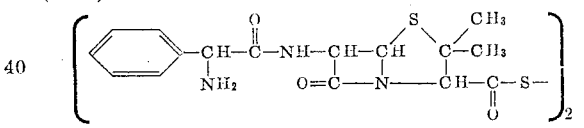
bis(6-α-aminophenylacetamidopenicillanyl)disulfide;

(LXIII)
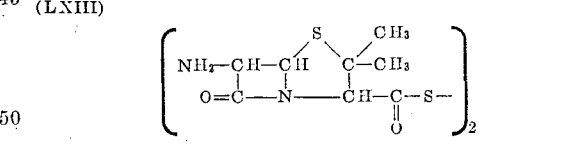
bis(6-aminopenicillanyl)disulfide;

The compounds of the present invention are prepared from the corresponding penicillins, i.e., the penicillins of the formula (LXIV)
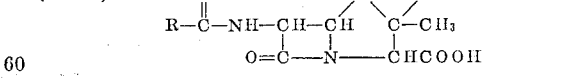

wherein R is as represented above. Such penicillins can be prepared and isolated by a variety of methods presently known in the art and described in many United States and foreign patents, e.g., U.S. Patents No. 2,941,995, No. 2,996,501, No. 3,035,047 and No. 3,080,356, and British Patents No. 877,120, No. 870,395, No. 891,279 and No. 899,199, and in other scientific literature, e.g., the article eititled "Derivatives of 6-Aminopenicillanic Acid. I. Partially Synthetic Penicillins Prepared from α-Aryloxy-alkanoic Acids" by Perron et al., vol. 82, J.A.C.S., pp. 3934–3938 (1960).

While most of the starting penicillins are well known in the art, or can be prepared by the procedures described in the above cited patents and publications, it is more convenient to prepare the starting penicillins having the formula (LXV)

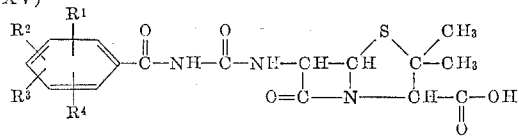

wherein $R^1$, $R^2$, $R^3$ and $R^4$ are as above, by a different method. These penicillins are prepared by the reaction of the appropriate benzoylisocyanate, i.e., a compound having the formula (LXVI)

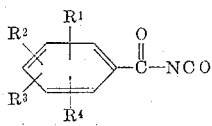

wherein $R^1$, $R^2$, $R^3$ and $R^4$ have the meaning set forth above, with 6-aminopenicillanic acid, preferably in the form of an easily hydrolyzed ester or of a salt of an alkali or alkaline earth metal or of a tertiary amine, e.g., a tertiary aliphatic amine such as triethylamine. The conduct of the reaction is facilitated by the presence of an unreactive, anhydrous organic solvent, such as dimethylacetamide or methylene chloride; it is also convenient to use an excess of triethylamine as the solvent. An unreactive solvent is one which provides no active hydrogen. Low temperatures, e.g., about 0° C. or room temperature, are preferred but not essential. Roughly equimolecular quantities of the two reagents are used. When formed as the triethylamine salt, the product is converted to the free acid form and thence to other salts in the manner used with benzylpenicillin and other penicillins. Thus, treatment of such a triethylamine compound in water with sodium hydroxide converts it to the sodium salt, and the triethylamine may be removed by extraction, as with toluene. Treatment of the sodium salt with strong aqueous acid converts the compound to the acid form, which can be converted to other amine salts, e.g., a procaine salt, by reaction with the amine base. Salts so formed are isolated by lyophilization or, if the product is insoluble, by filtration. A preferred method of isolating the product as a crystalline potassium salt comprises extracting the product from an acidic, aqueous solution (e.g., pH 2) into a water-immiscible solvent such as n-butanol or diethyl-ether, drying and adding at least one equivalent of a solution of potassium 2-ethylhexanoate (e.g., 0.373 gm./ml.) in dry n-butanol. The potassium salt forms, precipitates, usually in crystalline form, and is collected by filtration or decantation.

The benzoylisocyanates are prepared from the corresponding benzoic acid chlorides either by reaction with silver cyanate according to Billeter, Ber. 36, 3213 (1903) or Hill, J. Am. Chem. Soc. 62, 1595 (1940) or by reaction with ammonia to form the amide, followed by reaction of the amide with oxalyl chloride according to Speziale and Smith, J. Org. Chem. 27, 3742 (1962).

The substituted benzoyl chlorides (and the acids from which they are prepared, as by reaction with thionyl chloride) required above are prepared by a variety of methods which are common in the art. Most of these acids and acid chlorides are described in the prior art, and many of them are commercially available. Detailed discussion of methods for the preparation of these starting materials are found in such reference works as The Chemistry of Carbon Compounds, E. H. Rodd, Editor (1956), Elsevier Publishing Company, particularly in volumes IIIA and IIIB.

To prepare the compounds of the present invention, an active acylating derivative of the starting penicillin such as an anhydride or an acid chloride is prepared and reacted with a source of sulfide ions, e.g., sodium disulfide or potassium disulfide. In a preferred process for the preparation of the compounds of the present invention, a mixed anhydride (for instance, the mixed anhydride with ethoxy- or isobutoxy-carbonic acid), of a penicillin as described above is prepared according to the procedures illustrated in the examples below and in U.S. Patent No. 2,751,378. Such mixed anhydride is then reacted with an alkali disulfide, e.g., sodium disulfide ($Na_2S_2$), to produce the compounds of the present invention which may then be isolated and purified according to the procedures which are known and described in the prior art.

Functional equivalents of the foregoing mixed anhydride of penicillins may also be used. One such functional equivalent is the azolide corresponding to the penicillins of Formula LXIV above, i.e., an amide of the corresponding penicillin whose nitrogen is a member of a quasi-aromatic five-membered ring containing at least two nitrogen atoms, i.e., imidazole, pyrazole, the triazoles, benzimidazole, benzotriazole and their substituted derivatives. As an example of the general method for the preparation of an azolide, N,N'-carbonyldiimidazole is reacted with a carboxylic acid (penicillin in the acid form) in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield diimidazolides. The by-product, imidazole, precipitates, and may be separated, and the imidazolide isolated, but this is not essential.

Thus, an elegant procedure for preparing a compound of the present invention by way of a mixed anhydride with ethoxy- or isobutoxy-carbonic acid comprises mixing substantially stoichiometric equivalents of an acid (of Formula LXIV above), isobutyl chloroformate (or ethyl chloroformate) and if desired, an acid binding agent such as tertiary hydrocarbonyl amine having the formula

wherein the R groups contain only the elements carbon and hydrogen, or an aliphatic amine (slight excess), e.g., 2,6-lutidine or triethylamine, in an anhydrous, inert and preferably water-miscible solvent such as tetrahydrofuran and if desired, 2 ml. pure, dry acetone for a short period of time, e.g., about 5 to 60 minutes in the cold, e.g., at about 5° C. To this solution of the mixed anhydride, there is then added a chilled solution of sodium disulfide in water. The reaction mixture is stirred for a period of an hour or so to form the desired disulfide product. The mixture may then, if desired, be extracted with a water-immiscible solvent such as methyl isobutyl ketone to separate the product. The extract is washed with water quickly in the cold, if desired, and then dried, as with anhydrous $Na_2SO_4$. The solvent is stripped, leaving the disulfide in the form of an oil.

Since some of the antibiotic substances obtained by the process of this invention are relatively unstable compounds which readily undergo chemical changes resulting in the loss of an antibiotic activity, it is desirable to choose reaction conditions which are sufficiently moderate to avoid their decomposition. The reaction condition chosen will, of course, depend largely upon the reactivity of the chemical reagent being used. In most instances, a compromise has to be made between the use of very mild conditions for a lengthy period, and the use of more vigorous conditions for a shorter time with the possibility of decomposing some of the antibiotic substance.

The temperature chosen for the process of preparation of the compounds of the present invention should, in general, not exceed 30° C., and in many cases, a suitable temperature is ambient temperature. In addition to the use of tetrahydrofuran media for the reaction, use can be made of other organic solvents which do not contain reactive hydrogen atoms. Examples of such inert solvents are dimethylformamide, dimethylacetamide, methylene dichloride, chloroform, acetone, methyl isobutyl ketone and dioxane. Vigorous stirring is, of course, advisable when more than one phase is present, e.g., solid and liquid or two liquid phases.

The compounds of the present invention are also prepared from the corresponding thiopenicillins, i.e., the thiopenicillins of the formula (LXVII)

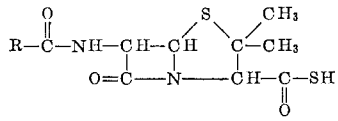

wherein R is as represented above. Such thiopenicillins are prepared from penicillins and isolated by the method described in U.S. Patent No. 2,751,378 and Example 2 herein. To prepare the thiopenicillins, an active acylating derivative of the starting penicillin such as an anhydride or an acid chloride is prepared and reacted with a source of sulfhydryl groups, e.g., hydrogen sulfide or sodium hydrosulfide or potassium hydrosulfide. In a preferred process for the preparation of the thiopenicillins, a mixed anhydride (for instance, the mixed anhydride with ethoxy- or isobutyloxy-carbonic acid), of a penicillin as described above (Formula LXIV) is prepared according to the procedure illustrated in the examples below and in U.S. Patent No. 2,751,378. Such mixed anhydride is then reacted with an alkali salt of hydrogen sulfide, e.g., sodium hydrogen sulfide (NaHS), to produce the thiopenicillins which may then be isolated and purified according to the procedures which are known and described in the prior art.

To prepare the compounds of this invention from thiopenicillins the starting thiopenicillin is reacted with an oxidizing agent such as iodine, in an anhydrous, inert and preferably water-immiscible solvent such as ether. The mixture is washed with aqueous sodium bicarbonate solution and then water to remove unreacted starting materials and then dried with anhydrous sodium sulfate. The solvent is then evaporated to leave the disulfide product.

Another method for the preparation of the compounds of the present invention comprises acylating bis(6-aminopenicillanyl)disulfide according to procedures which are known in the prior art, e.g., the acid chloride and mixed anhydride procedures which are described in many United States and foreign patents such as are listed above.

Bis(6-aminopenicillanyl)disulfide can be prepared from 6-aminopenicillanic acid by first protecting the amino group of 6-aminopenicillanic acid with a protecting group such as described in U.S. Patent No. 2,985,648, then forming a mixed anhydride of such protected 6-aminopenicillanic acid by reacting the protected 6-aminopenicillanic acid with an ester of chlorocarbonic acid, e.g., ethyl chlorocarbonate, then reacting such mixed anhydride with sodium hydrogen sulfide and then reacting the 6-aminothiopenicillanic acid thus formed with an oxidizing agent, i.e., iodine, and thereafter removing the protecting group by catalytic hydrogenation. Alternatively, the bis(6-aminopenicillanyl)disulfide may be prepared from benzylthiopenicillin as described in U.S. Patent No. 2,751,378. The steps comprising enzymatically hydrolyzing such benzylthiopenicillin to produce 6-aminothiopenicillanic acid, adding a protecting group to the 6-aminothiopenicillanic acid thus formed, reacting the 6-aminopenicillanic acid with iodine, and then removing the protecting group.

An additional method of preparing the compounds of this invention comprises reacting the acid chloride of the starting penicillin with a compound of the formula $$Na—S—SO_2—ONa$$

for about 48 hours at room temperature according to the method of Westlake et al., vol. 67, J.A.C.S., 1861 (1945). The disulfide precipitates from the reaction mixture upon standing.

When penicillins having the formula (LXVIII)

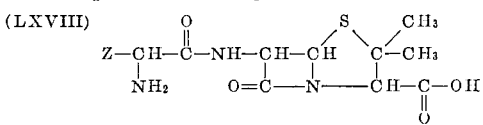

or thiopenicillins having the formula (LXIX)

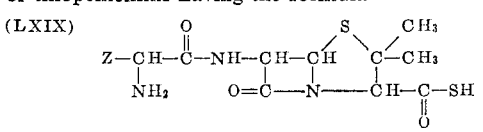

are used in the reaction to prepare the correspoding disulfide of this invention, it is apparent that the NH₂— group must be blocked before proceeding with the reaction. This is conveniently accomplished by the method described above. In addition, the disulfides produced from these starting materials are readily converted to their acid addition salts, i.e., hydrochloride, etc. by procedures well known in the art.

The compounds of the present invention are useful in the treatment of infections caused by Gram-positive bacteria, including particularly the resistant strains of bacteria, e.g., penicillin-resistant strains of Staphylococcus aureus (Micrococcus pyogenes var. aureus). In addition, the compounds of the present invention, in addition to their potent antibacterial activity, exhibit resistance to destruction by acid.

In the treatment of bacterial infections in man, the compounds of this invention are administered orally or parenterally, in accordance with conventional procedures for antibiotic administration, in an amount of from about 5 to 60 mg./kg./day, and preferably about 20 mg./kg./day in divided dosage, e.g., three or four times a day. They are administered in dosage units containing, for example, 125 or 250 or 500 mg. of active ingredient with suitable physiologically acceptable carriers or excipients. The dosage units can be in the form of liquid preparations such as solutions, dispersions or emulsions, or in solid form such as tablets, capsules, etc.

The following examples will serve to illustrate this invention without limiting it thereto.

EXAMPLE 1

*Preparation of bis(6-phenylmercaptoacetamido-penicillanyl)disulfide*

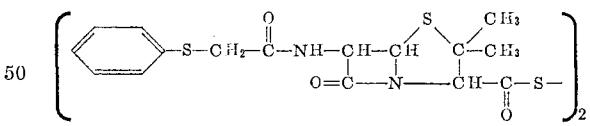

A solution of potassium 6-(phenylmercaptoacetamido)-penicillanate (12.13 gm., 0.0300 mole) and triethylamine hydrochloride (6.17 gm., 0.0450 mole) in methylene chloride (420 ml.) is stirred for one-half hour at 25° C. A fine precipitate of potassium chloride forms. The methylene chloride is evaporated under reduced pressure leaving residual oil. The residue is dissolved in dimethyl formamide (150 ml.) and cooled to 0° to —5° C. Ethyl chloroformate (3.25 gm., 0.0300 mole) is added all at once. The mixture is stirred for 10 minutes and a suspension of sodium hydrosulfide trihydrate (6.7 gm., 0.06 mole) in dimethyl formamide (100 ml.) is added all at once. Stirring is continued for 25 minutes and the solution turns dark green-brown. The solution is poured into water (1100 ml.) and acidified to pH 2 with dilute sulfuric acid. The 6-(phenylmercaptoacetamido)-thiopenicillanic acid is extracted into ether, washed with water, and dried over anhydrous sodium sulfate. Potassium 2-ethylhexanoate (0.03 mole) is added as a 50% solution of potassium 2-ethylhexanoate in ether. A crystalline precipitate forms and is collected, washed with acetone and ether, and dried. The product, potassium 6 - (phenylmercaptoacetamido)thiopenicillanate weighs 6.99 gm., is found to have a melting point of 220° to 225° C. with decomposition, the structure is confirmed by infrared analysis, and has the following elemental analysis:

Calculated for $C_{16}H_{17}N_2O_3S_3K$: C, 45.68%; H, 4.08%; N, 6.66%; S, 22.87%. Found: C, 45.88%; H, 4.02%; N, 6.45%; S, 22.36%.

Dilute hydrochloric acid is added to a solution of potassium 6 - (phenylmercaptoacetamido)thiopenicillanate (2.1 gm., 0.005 mole), dissolved in water (100 ml.) until a pH of 2 is attained. The thiopenicillin acid is extracted from this solution into ether (200 ml.) and 4.0 milliequivalents iodine in ether (40 ml. of 0.1 N $I_2$ in ether) is added. The ether extract is washed with 2% aqueous solution of sodium bicarbonate, then water, and dried over sodium sulfate. The ether is evaporated under reduced pressure to leave a residue. The residue is transferred to a weighed flask in methylene chloride and evaporated to dryness. The product, bis(6-phenylmercaptoacetamidopenicillanyl)disulfide weighs 1.6 gm., is found to contain the β-lactam ring by infrared analysis, and to have the following elemental analysis:

Calculated for $C_{32}H_{34}N_4S_6O_6$: C, 50.1%; H, 4.5%; S, 25.6%. Found: C, 50.20%; H, 4.55%; S, 24.6%.

The product is found to inhibit *Staph. aureus* Smith at a concentration of 0.062 mcg./ml., and *Staph. aureus* BX–1633–2 (a strain resistant to benzylpenicillin) at a concentration of 25–100 mcg./ml., and to exhibit upon intramuscular injection in mice a $CD_{50}$ against *Staph. aureus* Smith of 1.3 mg./kg.

EXAMPLE 2

*Preparation of the paratoluenesulfonic acid salt of bis(6-α-aminophenylacetamido-penicillanyl)disulfide*

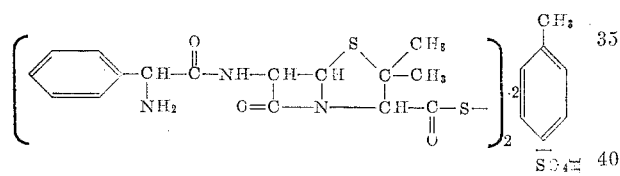

6 - (α - tritylaminophenylacetamido)penicillanic acid (6 gm., 0.01 mole) which is obtained by the reaction of equivalent quantities of 6-(α-aminophenylacetamido)penicillanic acid and trityl chloride in aqueous sodium hydroxide is dissolved in methylene chloride (150 ml.), and filtered. The methylene chloride is evaporated under reduced pressure to leave a residual oil. The residue is dissolved in tetrahydrofuran (50 ml.), and triethylamine (1.4 ml., 0.01 mole) is added. The mixture is cooled to −5° C. and ethyl chloroformate (1 ml., 0.01 mole) is added. The mixture is stirred for 20 minutes and a cooled solution of 0.64 gm. (0.005 mole) sodium sulfide (assaying 60–62% $Na_2S$) and 0.16 gm. (0.005 gm. atom) of elemental sulfur in water (50 ml.), prepared by warming on the steam bath, is added dropwise over a period of 10 minutes at −5° to 3° C. A pink suspension of solids results and is allowed to warm up to 6° to 8° C., and the solid disappears to give a pink emulsion. The emulsion is stirred for 1¾ hours at 6° to 8° C., methyl isobutyl ketone (200 ml.) is added and the aqueous phase separated. The methyl isobutyl ketone phase is washed twice with 50 ml. portions of water, dried over sodium sulfate, filtered, and the solvent stripped at reduced pressure, leaving a residual oil. Skellysolve B (a petroleum distillate fraction consisting essentially of n-hexane and having a boiling point range of about 60° to 68° C.) is added to the residual oil causing it to become more viscous. The Skellysolve B is decanted, and the remaining Skellysolve B removed by evaporation under reduced pressure. Methylene chloride (100 ml.) is added to the residue, and the infrared spectrum of the solution exhibits bands at 1785 cm.$^{-1}$ (β-lactam), 1710 cm.$^{-1}$ (c.=0), and 1690 to 1660 cm.$^{-1}$ shoulder (amide). The methylene chloride is stripped under reduced pressure from the solution, and the residue placed in vacuum for ¾ hour. The fluffy solid, bis (6-α-tritylaminophenylacetamidopenicillanyl)disulfide,

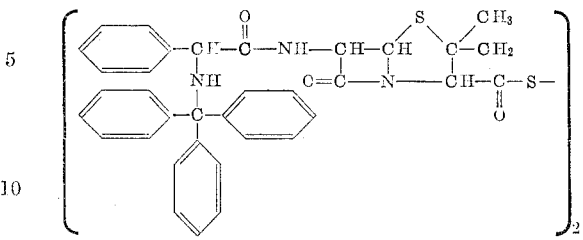

is recovered, and weighs 4.3 gm.

Paratoluenesulfonic acid monohydrate (1.33 gm., 0.07 mole) is added to a solution of bis(6-α-tritylaminophenylacetamidopenicillanyl)disulfide (4.3 gm.) in acetone (50 ml.) at room temperature. Within 10 minutes, a viscous oil starts to separate from the initially clear solution, and deposits on the walls of the flask. After ¾ hour, the acetone is decanted, and the oil washed twice with 25 ml. portions of acetone. Methyl isobutyl ketone is added, and the solids are collected by filtration, and washed with methyl isobutyl ketone and Skellysolve B. The product, the paratoluenesulfonic acid salt of bis(6-α-aminophenylacetamidopenicillanyl)disulfide, weighs 1.1 gm., is found to contain the β-lactam ring by infrared analysis, and to have the following elemental analysis:

Calculated for $(C_{23}H_{26}N_3O_5S_3)_2$: C, 53.0%; H, 5.03%; S, 18.45%. Found: C, 53.00%; H, 5.80%; S, 14.95%.

The product is found to inhibit *Staph. aureus* Smith at a concentration of 0.25 mcg./ml.

EXAMPLE 3

In the procedure of Example 2, the 6-(α-tritylaminophenylacetamido)penicillanic acid is replaced by 0.01 mole of 6-(DL-α-phenoxypropionamido)penicillanic acid,
6-(α-2-chlorophenoxypropionamido)penicillanic acid,
6-(α-4-sulfamylphenoxy-n-butyramido)penicillanic acid,
6-(α-3,4-dimethoxyphenoxy-n-pentanoamido)penicillanic acid,
6-(α-3-methylphenoxyisovaleramido)penicillanic acid,
6-(α-4-methylthiophenoxypropionamido)penicillanic acid,
6-(α-4-dimethylaminophenoxy-n-hexanoamido)penicillanic acid,
6-(α-2-methoxyphenoxy-n-decanoamido)penicillanic acid,
6-(α-2,4-dichlorophenoxyphenylacetamido)penicillanic acid,
6-(α-2-nitrophenoxy-β-phenylpropionamido)penicillanic acid,
6-(α-2-acetamidophenoxy-γ-phenylbutyramido)penicillanic acid,
6-(α-2,4-dimethylphenoxy-n-butyramido)penicillanic acid,
6-(α-4-isopropylphenoxypropionamido)penicillanic acid,
6-(α-3-bromophenoxy-n-butyramido)penicillanic acid,
6-(α-2-iodophenoxyphenylacetamido)penicillanic acid,
6-(α-2-diethylaminophenoxyisovaleramido)penicillanic acid,
6-(α-3,5-dichlorophenoxyisohexanoamido)penicillanic acid,
6-(D-α-phenoxypropionamido)penicillanic acid,
6-(L-α-phenoxypropionamido)penicillanic acid,
6-(α-isopropylphenoxyacetamido)penicillanic acid,
6-(α-phenoxybutyramido)penicillanic acid,
6-(α-4-cyclohexylphenoxypropionamido)penicillanic acid,
6-(α-phenoxyisovaleramido)penicillanic acid,
6-(α-phenoxy-n-decanoamido)penicillanic acid,
6-(α-phenoxy-γ-phenylbutyramido)penicillanic acid,
6-(α-2-benzylphenoxy-n-butyramido)penicillanic acid,
6-(α-2-trifluoromethylphenoxypropionamido)penicillanic acid and
6-(α-4-fluorophenoxypropionamido)penicillanic acid, to produce bis(6-DL-α-phenoxypropionamidopenicillanyl)disulfide, bis(6-α-2-chlorophenoxypropionamidopenicillanyl)disulfide,
bis(6-α-4-sulfamylphenoxy-n-butyramidopenicillanyl)disulfide,
bis(6-α-3,4-dimethoxyphenoxy-n-pentanoamidopenicillanyl)disulfide,
bis(6-α-3-methylphenoxyisovaleramidopenicillanyl)disulfide,
bis(6-α-4-methylthiophenoxypropionamidopenicillanyl)-disulfide,
bis(6-α-4-dimethylaminophenoxy-n-hexanoamidopenicillanyl)disulfide,
bis(6-α-2-methoxyphenoxy-n-decanoamidopenicillanyl)-disulfide,
bis(6-α-2,4-dichlorophenoxyphenylacetamidopenicillanyl)disulfide,
bis(6-α-2-nitrophenoxy-β-phenylpropionamidopenicillanyl)disulfide,
bis(6-α-2-acetamidophenoxy-γ-phenylbutyramidopenicillanyl)disulfide,
bis(6-α-2,4-dimethylphenoxy-n-butyramidopenicillanyl)-disulfide,
bis(6-α-4-isopropylphenoxypropionamidopenicillanyl)disulfide,
bis(6-α-3-bromophenoxy-n-butyramidopenicillanyl)disulfide,
bis(6-α-2-iodophenoxyphenylacetamidopenicillanyl)disulfide,
bis(6-α-2-diethylaminophenoxyisovaleramidopenicillanyl)disulfide,
bis(6-α-3,5-dichlorophenoxyisohexanoamidopenicillanyl)-disulfide,
bis(6-D-α-phenoxypropionamidopenicillanyl)disulfide,
bis(6-L-α-phenoxypropionamidopenicillanyl)disulfide,
bis(6-α-isopropylphenoxyacetamidopenicillanyl)disulfide,
bis(6-α-phenoxybutyramidopenicillanyl)disulfide,
bis(6-α-4-cyclohexylphenoxypropionamidopenicillanyl)-disulfide,
bis(6-α-phenoxyisovaleramidopenicillanyl)disulfide,
bis(6-α-phenoxy-n-decanoamidopenicillanyl)disulfide,
bis(6-α-phenoxy-γ-phenylbutyramidopenicillanyl)disulfide,
bis(6-α-2-benzylphenoxy-n-butyramidopenicillanyl)disulfide,
bis(6-α-2-trifluoromethylphenoxypropionamidopenicillanyl)-disulfide and
bis(6-α-4-fluorophenoxypropionamidopenicillanyl)disulfide, respectively, each of which is found to inhibit *Staph. aureus* Smith at concentrations of 0.001 percent by weight.

EXAMPLE 4

In the procedure of Example 2, the 6-(α-tritylaminophenylacetamido)penicillanic acid is replaced by 0.01 mole of 6-(α-phenoxy-α-benzylpropionamido)penicillanic acid,
6-(α-phenylthio-α-benzylpropionamido)penicillanic acid,
6-(α-phenoxy-α-methylpropionamido)penicillanic acid,
6-(α-phenylthio-α-methylpropionamido)penicillanic acid,
6-(α-2,4-dichlorophenoxy-α-ethylpropionamido)penicillanic acid,
6-(α-2-chlorophenoxy-α-methylbutyramido)penicillanic acid,
6-(α-4-nitrophenoxy-α-methyl-n-butyramido)penicillanic acid,
6-(α-4-bromophenoxy-α-phenyl-n-valeramido)penicillanic acid,
6-(α-4-t-butylphenoxy-α-benzyl-n-butyramido)penicillanic acid,
6-(α-4-trifluoromethylphenoxy-α-phenyl-n-butyramido)penicillanic acid,
6-(α-3-fluorophenoxy-α-benzyl-n-valeramido)penicillanic acid,
6-(α-4-sulfamylphenoxy-α-methylpropionamido)penicillanic acid,
6-(α-2-benzylphenoxy-α-methyl-n-butyramido)penicillanic acid,
6-(α-3-methoxyphenoxy-α-methyldecanoamido)penicillanic acid,
6-(α-2-iodophenoxy-α-phenylpropionamido)penicillanic acid,
6-(α-3-diethylaminophenoxy-α-methyl-n-butyramido)penicillanic acid and
6-(α-2,4-diisoamylphenoxy-α-methyl-n-butyramido)penicillanic acid, to produce bis(6-α-phenoxy-α-benzylpropionamidopenicillanyl)disulfide,
bis(6-α-phenylthio-α-benzylpropionamidopenicillanyl)disulfide,
bis(6-α-phenoxy-α-methylpropionamidopenicillanyl)disulfide,
bis(6-α-phenylthio-α-methylpropionamidopenicillanyl)disulfide,
bis(6-α-2,4-dichlorophenoxy-α-ethylpropionamidopenicillanyl)disulfide,
bis(6-α-2-chlorophenoxy-α-methylbutyramidopenicillanyl)disulfide,
bis(6-α-4-nitrophenoxy-α-methyl-n-butyramidopenicillanyl)disulfide,
bis(6-α-4-bromophenoxy-α-phenyl-n-valeramidopenicillanyl)disulfide,
bis(6-α-4-t-butylphenoxy-α-benzyl-n-butyramidopenicillanyl)disulfide,
bis(6-α-4-trifluoromethylphenoxy-α-phenyl-n-butyramidopenicillanyl)disulfide,
bis(6-α-3-fluorophenoxy-α-benzyl-n-valeramidopenicillanyl)disulfide,
bis(6-α-4-sulfamylphenoxy-α-methylpropionamidopenicillanyl)disulfide,
bis(6-α-2-benzylphenoxy-α-methyl-n-butyramidopenicillanyl)disulfide,
bis(6-α-3-methoxyphenoxy-α-methyldecanoamidopenicillanyl)disulfide,
bis(6-α-2-iodophenoxy-α-phenylpropionamidopenicillanyl)disulfide,
bis(6-α-3-diethylaminophenoxy-α-methyl-n-butyramidopenicillanyl)disulfide, and
bis(6-α-2,4-diisoamylphenoxy-α-methyl-n-butyramidopenicillanyl)disulfide, respectively, each of which is found to inhibit *Staph. aureus* Smith at concentrations of 0.001 percent by weight.

EXAMPLE 5

In the procedure of Example 2, the 6-(α-tritylaminophenylacetamido)penicillanic acid is replaced by 0.01 mole of 6-(α-phenylthiopropionamido)penicillanic acid,
6-(α-paranitrophenylthiopropionamido)penicillanic acid,
6-(α-parachlorophenylthiopropionamido)penicillanic acid,
6-(α-phenylthiobutyramido)penicillanic acid,
6-(α-phenylthiocaproamido)penicillanic acid,
6-(α-phenylthioisovaleramido)penicillanic acid,
6-(α-4-t-butylphenylthiopropionamido)penicillanic acid,
6-(α-ortho-tolylthiopropionamido)penicillanic acid,
6-(α-ortho-nitrophenylthiopropionamido)penicillanic acid,
6-(α-parachlorophenylthiobutyramido)penicillanic acid,
6-(α-3,4,5-trichlorophenylthiopropionamido)penicillanic acid,
6-(α-3-trifluoromethylphenylthiobutyramido)penicillanic acid, 6-(α-parabromophenylthioisovaleramido)penicillanic acid,
6-(α-paraphenylphenylthiopropionamido)penicillanic acid,
6-(α-4-methoxyphenylthiocaproamido)penicillanic acid,
6-(α-4-cyclohexylphenylthiobutyramido)penicillanic acid,
6-(α-phenylthio-α-cyclohexylacetamido)penicillanic acid,
6-(α-phenylthio-α-cyclopentylacetamido)penicillanic acid,
6-(α-2,4-dichlorophenylthiocaproamido)penicillanic acid,
6-(α-2,4-diisoamylphenylthiopropionamido)penicillanic acid,
6-(α-4-benzylphenylthiopropionamido)penicillanic acid,
6-(α-4-sulfamylphenylthiobutyramido)penicillanic acid,
6-(α-2-allyloxyphenylthiopropionamido)penicillanic acid,
6-(α-4-allylphenylthioisovaleramido)penicillanic acid,
6-(α-4-dimethylaminophenylthiopropionamido)penicillanic acid,
6-(α-2,5-dichlorophenylthiobutyramido)penicillanic acid,
6-(α-2-iodophenylthiopropionamido)penicillanic acid,
6-(α-2-acetamidophenylthiopropionamido)penicillanic acid,
6-(α-4-diethylaminophenylthiopropionamido)penicillanic acid,
6-(α-3-fluorophenylthiobutyramido)penicillanic acid, to produce bis(6-α-phenylthiopropionamidopenicillanyl) disulfide,
bis(6-α-paranitrophenylthiopropionamidopenicillanyl) disulfide,
bis(6-α-parachlorophenylthiopropionamidopenicillanyl) disulfide,
bis(6-α-phenylthiobutyramidopenicillanyl) disulfide,
bis(6-α-phenylthiocaproamidopenicillanyl) disulfide,
bis(6-α-phenylthioisovaleramidopenicillanyl) disulfide,
bis(6-α-4-t-butylphenylthiopropionamidopenicillanyl) disulfide,
bis(6-α-ortho-tolylthiopropionamidopenicillanyl) disulfide,
bis(6-α-ortho-nitrophenylthiopropionamidopenicillanyl) disulfide,
bis(6-α-parachlorophenylthiobutyramidopenicillanyl) disulfide,
bis(6-α-3,4,5-trichlorophenylthiopropionamidopenicillanyl) disulfide,
bis(6-α-3-trifluoromethylphenylthiobutyramidopenicillanyl) disulfide,
bis(6-α-parabromophenylthioisovaleramidopenicillanyl) disulfide,
bis(6-α-paraphenylphenylthiopropionamidopenicillanyl) disulfide,
bis(6-α-4-methoxyphenylthiocaproamidopenicillanyl) disulfide,
bis(6-α-4-cyclohexylphenylthiobutyramidopenicillanyl) disulfide,
bis(6-α-phenylthio-α-cyclohexylacetamidopenicillanyl) disulfide,
bis(6-α-phenylthio-α-cyclopentylacetamidopenicillanyl) disulfide,
bis(6-α-2,4-dichlorophenylthiocaproamidopenicillanyl) disulfide,
bis(6-α-2,4-diisoamylphenylthiopropionamidopenicillanyl) disulfide,
bis(6-α-4-benzylphenylthiopropionamidopenicillanyl) disulfide,
bis(6-α-4-sulfamylphenylthiobutyramidopenicillanyl) disulfide,
bis(6-α-2-allyloxyphenylthiopropionamidopenicillanyl) disulfide,
bis(6-α-4-allylphenylthioisovaleramidopenicillanyl) disulfide,
bis(6-α-4-dimethylaminophenylthiopropionamidopenicillanyl) disulfide,
bis(6-α-2,5-dichlorophenylthiobutyramidopenicillanyl) disulfide,
bis(6-α-2-iodophenylthiopropionamidopenicillanyl) disulfide,
bis(6-α-2-acetamidophenylthiopropionamidopenicillanyl) disulfide,
bis(6-α-4-diethylaminophenylthiopropionamidopenicillanyl) disulfide,
bis(6-α-3-fluorophenylthiobutyramidopenicillanyl) disulfide, respectively, each of which is found to inhibit *Staph. aureus* Smith at concentrations of 0.001 percent by weight.

EXAMPLE 6

In the procedure of Example 2, the 6-(α-tritylaminophenylacetamido)penicillanic acid is replaced by 0.01 mole of 6-(2,6-dimethoxybenzamido)penicillanic acid,
6-(benzamido)penicillanic acid,
6-(N-t-butylphthalamido)penicillanic acid,
6-(3,5-dinitrobenzamido)penicillanic acid,
6-(2-ethoxy-1-naphthamido)penicillanic acid,
6-(2-chlorobenzamido)penicillanic acid,
6-(2-biphenylylcarboxamido)penicillanic acid,
6-(2-methylbenzamido)penicillanic acid,
6-(4-aminobenzamido)penicillanic acid,
6-(4-nitrobenzamido)penicillanic acid,
6-(4-hydroxybenzamido)penicillanic acid,
6-(3,4,5-trimethoxybenzamido)penicillanic acid,
6-(4-methylbenzamido)penicillanic acid,
6-(4-chlorobenzamido)penicillanic acid,
6-(3,4-dichlorobenzamido)penicillanic acid,
6-(3-nitrobenzamido)penicillanic acid,
6-(2,4,6-trimethoxybenzamido)penicillanic acid,
6-(2-hydroxybenzamido)penicillanic acid,
6-(4-ethoxybenzamido)penicillanic acid,
6-(2,6-dimethoxybenzamido)penicillanic acid,
6-(2,4,6-trimethylbenzamido)penicillanic acid,
6-(2,6-dichlorobenzamido)penicillanic acid,
6-(2,6-diethoxybenzamido)penicillanic acid,
6-(2,6-di-n-butoxybenzamido)penicillanic acid,
6-(2,6-dibenzyloxybenzamido)penicillanic acid,
6-(2,3,6-trimethoxybenzamido)penicillanic acid,
6-(2,4,6-tribromobenzamido)penicillanic acid,
6-(2,6-di-n-propoxybenzamido)penicillanic acid,
6-(2,6-dimethoxy-4-methylbenzamido)penicillanic acid,
6-(4,6-diethyl-2-methoxybenzamido)penicillanic acid,
6-(6-ethoxy-2-methoxybenzamido)penicillanic acid,
6-(2-methylthiobenzamido)penicillanic acid,
6-(2-benzylthiobenzamido)penicillanic acid,
6-(2-phenoxybenzamido)penicillanic acid,
6-(pentachlorobenzamido)penicillanic acid,
6-(2-phenylbenzamido)penicillanic acid and
6-(2-methoxybenzamido)penicillanic acid, to produce bis(6-2,6-dimethoxybenzamidopenicillanyl) disulfide,
bis(6-benzamidopenicillanyl) disulfide,
bis(6-N-t-butylphthalamidopenicillanyl) disulfide,
bis(6-3,5-dinitrobenzamidopenicillanyl) disulfide,
bis(6-2-ethoxy-1-naphthamidopenicillanyl) disulfide,
bis(6-2-chlorobenzamidopenicillanyl) disulfide,
bis(6-2-biphenylylcarboxamidopenicillanyl) disulfide,
bis(6-2-methylbenzamidopenicillanyl) disulfide,
bis(6-4-aminobenzamidopenicillanyl) disulfide,
bis(6-4-nitrobenzamidopenicillanyl) disulfide, bis(6-4-hydroxybenzamidopenicillanyl)disulfide,
bis(6-3,4,5-trimethoxybenzamidopenicillanyl)disulfide,
bis(6-4-methylbenzamidopenicillanyl)disulfide,
bis(6-4-chlorobenzamidopenicillanyl)disulfide,
bis(6-3,4-dichlorobenzamidopenicillanyl)disulfide,
bis(6-3-nitrobenzamidopenicillanyl)disulfide,
bis(6-2,4,6-trimethoxybenzamidopenicillanyl)disulfide,
bis(6-2-hydroxybenzamidopenicillanyl)disulfide,
bis(6-4-ethoxybenzamidopenicillanyl)disulfide,
bis(6-2,6-dimethoxybenzamidopenicillanyl)disulfide,
bis(6-2,4,6-trimethylbenzamidopenicillanyl)disulfide,
bis(6-2,6-dichlorobenzamidopenicillanyl)disulfide,
bis(6-2,6-diethoxybenzamidopenicillanyl)disulfide,
bis(6-2,6-di-n-butoxybenzamidopenicillanyl)disulfide,
bis(6-2,6-dibenzyloxybenzamidopenicillanyl)disulfide,
bis(6-2,3,6-trimethoxybenzamidopenicillanyl)disulfide,
bis(6-2,4,6-tribromobenzamidopenicillanyl)disulfide,
bis(6-2,6-di-n-propoxybenzamidopenicillanyl)disulfide,
bis(6-2,6-dimethoxy-4-methylbenzamidopenicillanyl)disulfide,
bis(6-4,6-diethyl-2-methoxybenzamidopenicillanyl)disulfide,
bis(6-6-ethoxy-2-methoxybenzamidopenicillanyl)disulfide,
bis(6-2-methylthiobenzamidopenicillanyl)disulfide,
bis(6-2-benzylthiobenzamidopenicillanyl)disulfide,
bis(6-2-phenoxybenzamidopenicillanyl)disulfide,
bis(6-pentachlorobenzamidopenicillanyl)disulfide,
bis(6-2-phenylbenzamidopenicillanyl)disulfide, and
bis(6-2-methoxybenzamidopenicillanyl)disulfide,
respectively, each of which is found to inhibit *Staph. aureus* Smith at concentrations of 0.001 percent by weight.

EXAMPLE 7

In the procedure of Example 2, the 6-(α-tritylaminophenylacetamido)penicillanic acid is replaced by 0.01 mole of 6-(4-sulfamylbenzamido)penicillanic acid,
6-(3,4-dimethoxybenzamido)penicillanic acid,
6-(4-methoxybenzamido)penicillanic acid,
6-(3-methylbenzamido)penicillanic acid,
6-(3-dimethylaminobenzamido)penicillanic acid,
6-(2-methoxybenzamido)penicillanic acid,
6-(2-chloro-3,4,5-trimethoxybenzamido)penicillanic acid,
6-(2,4-dichlorobenzamido)penicillanic acid,
6-(2-nitrobenzamido)penicillanic acid,
6-(4-methylaminobenzamido)penicillanic acid,
6-(2-acetamidobenzamido)penicillanic acid,
6-(2,4-dimethylbenzamido)penicillanic acid,
6-(2,4,5-trimethylbenzamido)penicillanic acid,
6-(4-isopropylbenzamido)penicillanic acid,
6-(3-bromobenzamido)penicillanic acid,
6-(2-acetamidobenzamido)penicillanic acid,
6-(2-ethylaminobenzamido)penicillanic acid,
6-(2,5-dihydroxybenzamido)penicillanic acid,
6-(4-hydroxy-3-methoxybenzamido)penicillanic acid,
6-(4-allylbenzamido)penicillanic acid,
6-(4-allyloxybenzamido)penicillanic acid,
6-(2-trifluoromethylbenzamido)penicillanic acid,
6-(4-fluorobenzamido)penicillanic acid,
6-(2-phenylthiobenzamido)penicillanic acid,
6-(2-benzylbenzamido)penicillanic acid,
6-(2,6-dihydroxybenzamido)penicillanic acid,
6-(2,6-diacetoxybenzamido)penicillanic acid,
6-(2,6-dimethylthiobenzamido)penicillanic acid,
6-(2,4,6-trinitrobenzamido)penicillanic acid,
6-(2,6-diacetamidobenzamido)penicillanic acid,
6-(2,6-dibromobenzamido)penicillanic acid,
6-(2,6-dimethylbenzamido)penicillanic acid,
6-(2,6-diethylbenzamido)penicillanic acid,
6-(2,6-diisopropylbenzamido)penicillanic acid,
6-(2,6-diallyloxybenzamido)penicillanic acid,
6-(3-bromo-2,6-dimethoxybenzamido)penicillanic acid,
6-(4-chloro2,6-dimethoxybenzamido)penicillanic acid,
6-(2-chloro-6-nitrobenzamido)penicillanic acid, and
6-(2-hydroxy-6-methoxybenzamido)penicillanic acid, to produce bis(6-4-sulfamylbenzamidopenicillanyl)disulfide,
bis(6-3,4-dimethoxybenzamidopenicillanyl)disulfide,
bis(6-4-methoxybenzamidopenicillanyl)disulfide,
bis(6-3-methylbenzamidopenicillanyl)disulfide,
bis(6-3-dimethylaminobenzamidopenicillanyl)disulfide,
bis(6-2-methoxybenzamidopenicillanyl)disulfide,
bis(6-2-chloro-3,4,5-trimethoxybenzamidopenicillanyl)disulfide,
bis(6-2,4-dichlorobenzamidopenicillanyl)disulfide,
bis(6-2-nitrobenzamidopenicillanyl)disulfide,
bis(6-4-methylaminobenzamidopenicillanyl)disulfide,
bis(6-2-acetamidobenzamidopenicillanyl)disulfide,
bis(6-2,4-dimethylbenzamidopenicillanyl)disulfide,
bis(6-2,4,5-trimethylbenzamidopenicillanyl)disulfide,
bis(6-4-isopropylbenzamidopenicillanyl)disulfide,
bis(6-3-bromobenzamidopenicillanyl)disulfide,
bis(6-2-iodobenzamidopenicillanyl)disulfide,
bis(6-2-ethylaminobenzamidopenicillanyl)disulfide,
bis(6-2,5-dihydroxybenzamidopenicillanyl)disulfide,
bis(6-4-hydroxy-3-methoxybenzamidopenicillanyl)disulfide,
bis(6-4-allylbenzamidopenicillanyl)disulfide,
bis(6-4-allyloxybenzamidopenicillanyl)disulfide,
bis(6-2-trifluoromethylbenzamidopenicillanyl)disulfide,
bis(6-4-fluorobenzamidopenicillanyl)disulfide,
bis(6-2-phenylthiobenzamidopenicillanyl)disulfide,
bis(6-2-benzylbenzamidopenicillanyl)disulfide,
bis(6-2,6-dihydroxybenzamidopenicillanyl)disulfide,
bis(6-2,6-diacetoxybenzamidopenicillanyl)disulfide,
bis(6-2,6-dimethylthiobenzamidopenicillanyl)disulfide,
bis(6-2,4,6-trinitrobenzamidopenicillanyl)disulfide,
bis(6-2,6-diacetamidobenzamidopenicillanyl)disulfide,
bis(6-2,6-dibromobenzamidopenicillanyl)disulfide,
bis(6-2,6-dimethylbenzamidopenicillanyl)disulfide,
bis(6-2,6-diethylbenzamidopenicillanyl)disulfide,
bis(6-2,6-diisopropylbenzamidopenicillanyl)disulfide,
bis(6-2,6-diallyloxybenzamidopenicillanyl)disulfide,
bis(6-3-bromo-2,6-dimethoxybenzamidopenicillanyl)disulfide,
bis(6-4-chloro-2,6-dimethoxybenzamidopenicillanyl)disulfide,
bis(6-2-chloro-6-nitrobenzamidopenicillanyl)disulfide, and
bis(6-2-hydroxy-6-methoxybenzamidopenicillanyl)disulfide, respectively, each of which is found to inhibit *Staph. aureus* Smith at concentrations of 0.001 percent by weight.

EXAMPLE 8

In the procedure of Example 2, the 6-(α-tritylaminophenylacetamido)penicillanic acid is replaced by 0.01 mole of 6-(alkyl-N'-phthalamido)penicillanic acid,
6-(N-benzyl-N'-phthalamido)penicillanic acid,
6-(N-n-propyl-N'-phthalamido)penicillanic acid,
6-(N-n-amyl-N'-phthalamido)penicillanic acid,
6-(N-furfuryl-N'-phthalamido)penicillanic acid,
6-(N-1,2,5,6-tetrahydropyridyl-N'-phthalamido)penicillanic acid,
6-(N,N-tetramethylene-N'-phthalamido)penicillanic acid,
6-(N-2-phenylethyl-N'-phthalamido)penicillanic acid,
6-(N,N-pentamethylene-N'-phthalamido)penicillanic acid,
6-(N-isopropyl-N'-phthalamido)penicillanic acid,
6-(N-α-methylbenzyl-N'-phthalamido)penicillanic acid,
6-(N-hexamethylene-N'-phthalamido)penicillanic acid,
6-(N-tetrahydrofurfuryl-N'-phthalamido)penicillanic acid,
6-(N-morpholino-N'-phthalamido)penicillanic acid,
6-(N-2,6-dimethylmorpholino-N'-phthalamido)penicillanic acid,
6-(N,N-di-n-butylphthalamido)penicillanic acid, 6-(o-2-methyl-1,2,3,4-tetrahydroquinolyl-carbonylbenz-
    amido)penicillanic acid,
6-(N,N-diallyl-N'-phthalamido)penicillanic acid,
6-(N,N-diisopropyl-N'-phthalamido)penicillanic acid,
6-(N,N-diethyl-N'-phthalamido)penicillanic acid,
6-(N,N-dimethyl-N'-phthalamido)penicillanic acid,
6-(N-dodecyl-N'-phthalamido)penicillanic acid,
6-(N-t-butyl-N'-phthalamido)penicillanic acid,
6-(N-methyl-N'-phthalamido)penicillanic acid,
6-(N-ethyl-N'-phthalamido)penicillanic acid,
6-(N-isobutylphthalamido)penicillanic acid,
6-(N-α-methylpropylphthalamido)penicillanic acid,
6-(N-α-methylphenethyl-N'-phthalamido)penicillanic
    acid,
6-(N-2-methoxyphenyl-N'-phthalamido)penicillanic acid,
6-(N-phenyl-N-ethyl-N'-phthalamido)penicillanic acid,
6-(N-2-methyl-5-ethylpiperidino-N'-phthalamido)penicil-
    lanic acid,
6-(N-pyrrolidino-N'-phthalamido)penicillanic acid,
6-(N-2-methylpyrrolidino-N'-phthalamido)penicillanic
    acid,
6-(N-2,5-dimethylpyrrolidino-N'-phthalamido)penici-
    lanic acid,
6-(N,N-hexamethylene-N'-phthalamido)penicillanic acid,
6-(N-1,1,3,3-tetramethylbutyl-N'-phthalamido)penicil-
    lanic acid,
6-(N-cyclohexyl-N'-phthalamido)penicillanic acid,
6-(N-3-morpholinopropyl-N'-phthalamido)penicillanic
    acid and
6-(N-2-methylpiperidino-N'-phthalamido)penicillanic
    acid, to produce bis(6-alkyl-N'-phthalamidopenicillanyl)disulfide,
bis(6-N-benzyl-N'-phthalamidopenicillanyl)disulfide,
bis(6-N-n-propyl-N'-phthalamidopenicillanyl)disulfide,
bis(6-N-n-amyl-N'-phthalamidopenicillanyl)disulfide,
bis(6-N-furfuryl-N'-phthalamidopenicillanyl)disulfide,
bis(6-N-1,2,5,6-tetrahydropyridyl-N'-phthalamidopenicil-
    lanyl)disulfide,
bis(6-N,N-tetramethylene-N'-phthalamidopenicillanyl)di-
    sulfide,
bis(6-N-2-phenylethyl-N'-phthalamidopenicillanyl)disul-
    fide,
bis(6-N,N-pentamethylene-N'-phthalamidopenicillanyl)
    disulfide,
bis(6-N-isopropyl-N'-phthalamidopenicillanyl)disulfide,
bis(6-N-α-methylbenzyl-N'-phthalamidopenicillanyl)di-
    sulfide,
bis(6-N-hexamethylene-N'-phthalamidopenicillanyl)di-
    sulfide,
bis(6-N-tetrahydrofurfuryl-N'-phthalamidopenicillanyl)
    disulfide,
bis(6-N-morpholino-N'-phthalamidopenicillanyl)di-
    sulfide,
bis(6-N-2,6-dimethylmorpholino-N'-phthalamidopenicil-
    lanyl)disulfide,
bis(6-N,N-di-n-butylphthalamidopenicillanyl)disulfide,
bis(6-o-2-methyl-1,2,3,4-tetrahydroquinolyl-carbonyl-
    benzamidopenicillanyl)disulfide,
bis(6-N,N-diallyl-N'-phthalamidopenicillanyl)disulfide,
bis(6-N,N-diisopropyl-N'-phthalamidopenicillanyl)di-
    sulfide,
bis(6-N,N-diethyl-N'-phthalamidopenicillanyl)disulfide,
bis(6-N,N-dimethyl-N'-phthalamidopenicillanyl)disulfide,
bis(6-N-dodecyl-N'-phthalamidopenicillanyl)disulfide,
bis(6-N-t-butyl-N'-phthalamidopenicillanyl)disulfide,
bis(6-N-methyl-N'-phthalamidopenicillanyl)disulfide,
bis(6-N-ethyl-N'-phthalamidopenicillanyl)disulfide,
bis(6-N-isobutylphthalamidopenicillanyl)disulfide,
bis(6-N-α-methylpropylphthalamidopenicillanyl)disulfide,
bis(6-N-α-methylphenethyl-N'-phthalamidopenicillanyl)
    disulfide,
bis(6-N-2-methoxyphenyl-N'-phthalamidopenicillanyl)
    disulfide,
bis(6-N-phenyl-N-ethyl-N'-phthalamidopenicillanyl)
    disulfide,
bis(6-N-2-methyl-5-ethylpiperidino-N'-phthalamidopeni-
    cillanyl)disulfide,
bis(6-N-pyrrolidino-N'-phthalamidopenicillanyl)disulfide,
bis(6-N-2-methylpyrrolidino-N'-phthalaminopenicillanyl)
    disulfide,
bis(6-N-2,5-dimethylpyrrolidino-N'-phthalamidopenicil-
    lanyl)disulfide,
bis(6-N,N-hexamethylene-N'-phthalamidopenicillanyl)
    disulfide,
bis(6-N-1,1,3,3-tetramethylbutyl-N'-phthalamidopenicil-
    lanyl)disulfide,
bis(6-N-cyclohexyl-N'-phthalamidopenicillanyl)disulfide,
bis(6-N-3-morpholinopropyl-N'-phthalamidopenicillanyl)
    disulfide, and
bis(6-N-2-methylpiperidino-N'-phthalamidopenicillanyl)
    disulfide, respectively, each of which is found to inhibit *Staph.
aureus* Smith at concentrations of 0.001 percent by weight.

EXAMPLE 9

The following compounds are prepared according to
the general procedure of Example 2 above, using the cor-
responding penicillin as the starting material:
bis[6-(5-methyl-3-phenyl-4-isoxazolyl)carboxamido-
    penicillanyl]-disulfide,
bis[6-(3-m-chlorophenyl-5-methyl-4-isoxazolyl)carbox-
    amidopenicillanyl]disulfide,
bis[6-(3-o-chlorophenyl-5-methyl-4-isoxazolyl)carbox-
    amidopenicillanyl]disulfide,
bis[6-(3-2,4-dichlorophenyl-5-methyl-4-isoxazolyl)car-
    boxamidopenicillanyl]disulfide,
bis[6-(3-3,4-dichlorophenyl-5-methyl-4-isoxazolyl)
    carboxamidopenicillanyl]disulfide,
bis[6-(3-p-tolyl-5-methyl-4-isoxazolyl)carboxamidopeni-
    cillanyl]disulfide,
bis[6-(3-o-nitrophenyl-5-methyl-4-isoxazolyl)carbox-
    amidopenicillanyl]disulfide,
bis[6-(3-m-nitrophenyl-5-methyl-4-isoxazolyl)carbox-
    amidopenicillanyl]disulfide,
bis[6-(3-p-nitrophenyl-5-methyl-4-isoxazolyl)carbox-
    amidopenicillanyl]disulfide,
bis[6-(3-p-bromophenyl-5-methyl-4-isoxazolyl)carbox-
    amidopenicillanyl]disulfide,
bis[6-(3-p-fluorophenyl-5-methyl-4-isoxazolyl)carbox-
    amidopenicillanyl]disulfide,
bis[6-(3-p-methylsulfonylphenyl-5-methyl-4-isoxazolyl)
    carboxamidopenicillanyl]disulfide,
bis[6-(3-p-methoxyphenyl-5-methyl-4-isoxazolyl)carbox-
    amidopenicillanyl]disulfide,
bis[6-(3-p-trifluoromethylphenyl-5-methyl-4-isoxazolyl)
    carboxamidopenicillanyl]disulfide,
bis[6-(3-o-methoxyphenyl-5-methyl-4-isoxazolyl)carbox-
    amidopenicillanyl]disulfide,
bis[6-(3-p-ethoxyphenyl-5-methyl-4-isoxazolyl)carbox-
    amidopenicillanyl]disulfide,
bis[6-(3-3,4-dimethoxyphenyl-5-methyl-4-isoxazolyl)
    carboxamidopenicillanyl]disulfide,
bis]6-(3-p-dimethylaminophenyl-5-methyl-4-isoxazolyl)
    carboxamidopenicillanyl]disulfide,
bis[6-(3-α-naphthyl-5-methyl-4-isoxazolyl)carboxamido-
    penicillanyl]disulfide,
bis[6-(3-β-naphthyl-5-methyl-4-isoxazolyl)carboxamido-
    penicillanyl]disulfide,
bis[6-(3-phenyl-5-ethyl-4-isoxazolyl)carboxamidopeni-
    cillanyl]disulfide,
bis[6-(3-p-chlorophenyl-5-ethyl-4-isoxazolyl)carbox-
    amidopenicillanyl]disulfide,
bis[6-(3-phenyl-5-isopropyl-4-isoxazolyl)carboxamido-
    penicillanyl]disulfide,
bis[6-(3-phenyl-5-methylmercapto-4-isoxazolyl)carbox-
    amidopenicillanyl]disulfide,
bis[6-(3-methyl-5-o-chlorophenyl-4-isoxazolyl)carbox-
    amidopenicillanyl]disulfide, bis[6-(3-methyl-5-p-bromophenyl-4-isoxazolyl)carboxamidopenicillanyl]disulfide,
bis[6-(3-methyl-5-o-iodophenyl-4-isoxazolyl)carboxamidopenicillanyl]disulfide,
bis[6-(3-methyl-5-2,4-dichlorophenyl-4-isoxazolyl)carboxamidopenicillanyl]disulfide,
bis[6-(3-methyl-5-m-nitrophenyl-4-isoxazolyl)carboxamidopenicillanyl]disulfide,
bis[6-(3-methyl-5-p-tolyl-4-isoxazolyl)carboxamidopenicillanyl]disulfide,
bis[6-(3-methyl-5-p-nitrophenyl-4-isoxazolyl)carboxamidopenicillanyl]disulfide,
bis[6-(3-methyl-5-p-methoxyphenyl-4-isoxazolyl)carboxamidopenicillanyl]disulfide,
bis[6-(3-methyl-5-p-ethoxyphenyl-4-isoxazolyl)carboxamidopenicillanyl]disulfide,
bis[6-(3-methyl-5-2,6-dimethoxyphenyl-4-isoxazolyl)carboxamidopenicillanyl]disulfide,
bis[6-(3-methyl-5-p-methylsulfonylphenyl-4-isoxazolyl)carboxamidopenicillanyl]disulfide,
bis[6-(3-methyl-5-p-fluorophenyl-4-isoxazolyl)carboxamidopenicillanyl]disulfide,
bis[6-(3-methyl-5-p-cyanophenyl-4-isoxazolyl)carboxamidopenicillanyl]disulfide,
bis[6-(3-methyl-5-p-methylmercaptophenyl-4-isoxazolyl)carboxamidopenicillanyl]disulfide,
bis[6-(3-methyl-5-p-dimethylaminophenyl-4-isoxazolyl)carboxamidopenicillanyl]disulfide,
bis[6-(3-methyl-5-α-naphthyl-4-isoxazolyl)carboxamidopenicillanyl]disulfide,
bis[6-(3-methyl-5-β-naphthyl-4-isoxazolyl)carboxamidopenicillanyl]disulfide,
bis[6-(3-ethyl-5-phenyl-4-isoxazolyl)carboxamidopenicillanyl]disulfide,
bis[6-(3-ethyl-5-p-chlorophenyl-4-isoxazolyl)carboxamidopenicillanyl]disulfide,
bis[6-(3-isopropyl-5-phenyl-4-isoxazolyl)carboxamidopenicillanyl]disulfide,
bis[6-(3-t-butyl-5-methyl-4-isoxazolyl)carboxamidopenicillanyl]disulfide,
bis[6-(3-methyl-5-p-trifluoromethylphenyl-4-isoxazolyl)carboxamidopenicillanyl]disulfide,
bis[6-(3-methyl-5-cyclohexyl-4-isoxazolyl)carboxamidopenicillanyl]disulfide,
bis[6-(3-cyclohexyl-5-methyl-4-isoxazolyl)carboxamidopenicillanyl]disulfide,
bis[6-(3-α-furyl-5-methyl-4-isoxazolyl)carboxamidopenicillanyl]disulfide,
bis[6-(3-α-thienyl-5-methyl-4-isoxazolyl)carboxamidopenicillanyl]disulfide, respectively, each of which is found to inhibit *Staph. aureus* Smith at concentrations of 0.001 percent by weight.

EXAMPLE 10

In the procedure of Example 2, the 6-(α-tritylaminophenylacetamido)penicillanic acid is replaced by 0.01 mole of 3,5-diphenyl-4-isoxazolylpenicillin,
3-methyl-5-phenyl-4-isoxazolylpenicillin,
3,5-dimethyl-4-isoxazolylpenicillin,
5-benzyl-3-methyl-4-isoxazolylpenicillin,
3-methyl-5-styryl-4-isoxazolylpenicillin,
5-t-butyl-3-phenyl-4-isoxazolylpenicillin,
5-2-furyl-3-methyl-4-isoxazolylpenicillin,
3-methyl-5-3',5'-dimethyl-4'-isoxazolyl-4-isoxazolylpenicillin,
3-methyl-5-2-thienyl-4-isoxazolylpenicillin,
3-p-chlorophenyl-5-methyl-4-isoxazolylpenicillin,
3-methyl-5-methylmercapto-4-isoxazolylpenicillin,
5-p-chlorophenyl-3-methyl-4-isoxazolylpenicillin,
3-methyl-5-o-nitrophenyl-4-isoxazolylpenicillin,
5-isopropyl-3-methyl-4-isoxazolylpenicillin and
5-methyl-3-p-chlorophenyl-4-isoxazolylpenicillin, to produce bis[6-(3,5-diphenyl-4-isoxazolyl)penicillanyl]disulfide,
bis[6-(3-methyl-5-phenyl-4-isoxazolyl)penicillanyl]disulfide,
bis[6-(3,5-dimethyl-4-isoxazolyl)penicillanyl]disulfide,
bis[6-(5-benzyl-3-methyl-4-isoxazolyl)penicillanyl]disulfide,
bis[6-(3-methyl-5-styryl-4-isoxazolyl)penicillanyl]disulfide,
bis[6-(5-t-butyl-3-phenyl-4-isoxazolyl)penicillanyl]disulfide,
bis[6-(5-2-furyl-3-methyl-4-isoxazolyl)penicillanyl]disulfide,
bis[6-(3-methyl-5-3',5'-dimethyl-4'-isoxazolyl-4-isoxazolyl)penicillanyl]disulfide,
bis[6-(3-methyl-5-2-thienyl-4-isoxazolyl)penicillanyl]disulfide,
bis[6-(3-p-chlorophenyl-5-methyl-4-isoxazolyl)penicillanyl]disulfide,
bis[6-(3-methyl-5-methylmercapto-4-isoxazolyl)penicillanyl]disulfide,
bis[6-(5-p-chlorophenyl-3-methyl-4-isoxazolyl)penicillanyl]disulfide,
bis[6-(3-methyl-5-o-nitrophenyl-4-isoxazolyl)penicillanyl]disulfide,
bis[6-(5-isopropyl-3-methyl-4-isoxazolyl)penicillanyl]disulfide,
bis[6-(5-methyl-3-p-chlorophenyl-4-isoxazolyl)penicillanyl]disulfide, respectively, each of which is found to inhibit *Staph. aureus* Smith at concentrations of 0.001 percent by weight.

EXAMPLE 11

In the procedure of Example 2, the 6-(α-tritylaminophenylacetamido)penicillanic acid is replaced by 0.01 mole of 6-(α-2-chlorophenoxyacetamido)penicillanic acid,
6-(α-4-sulfamylphenoxyacetamido)penicillanic acid,
6-(α-3,4-dimethoxyphenoxyacetamido)penicillanic acid,
6-(α-3-methylphenoxyacetamido)penicillanic acid,
6-(α-4-methylthiophenoxyacetamido)penicillanic acid,
6-(α-4-dimethylaminophenoxyacetamido)penicillanic acid,
6-(α-2-methoxyphenoxyacetamido)penicillanic acid,
6-(α-2,4-dichlorophenoxyphenoxyacetamido)penicillanic acid,
6-(α-2-nitrophenoxyacetamido)penicillanic acid,
6-(α-2-acetamidophenoxyacetamido)penicillanic acid,
6-(α-2,4-dimethylphenoxyacetamido)penicillanic acid,
6-(α-4-isopropylphenoxyacetamido)penicillanic acid,
6-(α-3-bromophenoxyacetamido)penicillanic acid,
6-(α-2-iodophenoxyphenoxyacetamido)penicillanic acid,
6-(α-2-diethylaminophenoxyacetamido)penicillanic acid,
6-(α-3,5-dichlorophenoxyacetamido)penicillanic acid,
6-(α-4-cyclohexylphenoxyacetamido)penicillanic acid,
6-(α-phenoxyacetamido)penicillanic acid,
6-(α-2-benzylphenoxyacetamido)penicillanic acid,
6-(α-2-trifluoromethylphenoxyacetamido)penicillanic acid, and
6-(α-4-chlorophenoxyacetamido)penicillanic acid, respectively, to produce bis(6-α-2-chlorophenoxyacetamidopenicillanyl)disulfide,
bis(6-α-4-sulfamylphenoxyacetamidopenicillanyl)disulfide,
bis(6-α-3,4-dimethoxyphenoxyacetamidopenicillanyl)disulfide,
bis(6-α-3-methylphenoxyacetamidopenicillanyl)disulfide,
bis(6-α-4-methylthiophenoxyacetamidopenicillanyl)disulfide,
bis(6-α-4-dimethylaminophenoxyacetamidopenicillanyl)disulfide,
bis(6-α-2-methoxyphenoxyacetamidopenicillanyl)disulfide, bis(6-α-2,4-dichlorophenoxyphenoxyacetamidopenicillanyl)disulfide,
bis(6-α-2-nitrophenoxyacetamidopenicillanyl)disulfide,
bis(6-α-2-acetamidophenoxyacetamidopenicillanyl) disulfide,
bis(6-α-2,4-dimethylphenoxyacetamidopenicillanyl) disulfide,
bis(6-α-4-isopropylphenoxyacetamidopenicillanyl) disulfide,
bis(6-α-3-bromophenoxyacetamidopenicillanyl)disulfide,
bis(6-α-2-iodophenoxyphenoxyacetamidopenicillanyl) disulfide,
bis(6-α-2-diethylaminophenoxyacetamidopenicillanyl) disulfide,
bis(6-α-3,5-dichlorophenoxyacetamidopenicillanyl) disulfide,
bis(6-α-4-cyclohexylphenoxyacetamidopenicillanyl) disulfide,
bis(6-α-phenoxyacetamidopenicillanyl)disulfide,
bis(6-α-2-benzylphenoxyacetamidopenicillanyl)disulfide,
bis(6-α-2-trifluoromethylphenoxyacetamidopenicillanyl) disulfide and
bis(6-α-4-chlorophenoxyacetamidopenicillanyl)disulfide, respectively, each of which is found to inhibit *Staph. aureus* Smith at concentrations of 0.001 percent by weight.

EXAMPLE 12

In the procedure of Example 2, the 6-(α-tritylaminophenylacetamido)penicillanic acid is replaced by 0.01 mole of
6-(α-4-nitrophenoxyacetamido)penicillanic acid,
6-(α-4-bromophenoxyacetamido)penicillanic acid,
6-(α-4-t-butylphenoxyacetamido)penicillanic acid,
6-(α-4-trifluoromethylphenoxyacetamido)penicillanic acid,
6-(α-3-fluorophenoxyacetamido)penicillanic acid,
6-(α-4-sulfamylphenoxyacetamido)penicillanic acid,
6-(α-2-benzylphenoxyacetamido)penicillanic acid,
6-(α-3-methoxyphenoxyacetamido)penicillanic acid,
6-(α-2-iodophenoxyacetamido)penicillanic acid,
6-(α-3-diethylaminophenoxyacetamido)penicillanic acid, and
6-(α-2,4-diisoamylphenoxyacetamido)penicillanic acid, respectively, to produce
bis(6-α-4-nitrophenoxyacetamidopenicillanyl)disulfide,
bis(6-α-4-bromophenoxyacetamidopenicillanyl)disulfide,
bis(6-α-4-t-butylphenoxyacetamidopenicillanyl)disulfide,
bis(6-α-4-trifluoromethylphenoxyacetamidopenicillanyl) disulfide,
bis(6-α-3-fluorophenoxyacetamidopenicillanyl)disulfide,
bis(6-α-4-sulfamylphenoxyacetamidopenicillanyl) disulfide,
bis(6-α-2-benzylphenoxyacetamidopenicillanyl)disulfide,
bis(6-α-3-methoxyphenoxyacetamidopenicillanyl) disulfide,
bis(6-α-2-iodophenoxyacetamidopenicillanyl)disulfide,
bis(6-α-3-diethylaminophenoxyacetamidopenicillanyl) disulfide and
bis(6-α-2,4-diisoamylphenoxyacetamidopenicillanyl) disulfide, respectively, each of which is found to inhibit *Staph. aureus* Smith at concentrations of 0.001 percent by weight.

EXAMPLE 13

In the procedure of Example 2, the 6-(α-tritylaminophenylacetamido)penicillanic acid is replaced by 0.01 mole of
6-(α-phenylthioacetamido)penicillanic acid,
6-(α-paranitrophenylthioacetamido)penicillanic acid,
6-(α-parachlorophenylthioacetamido)penicillanic acid,
6-(α-4-t-butylphenylthioacetamido)penicillanic acid,
6-(α-ortho-tolylthioacetamido)penicillanic acid,
6-(α-ortho-nitrophenylthioacetamido)penicillanic acid,
6-(α-3,4,5-trichlorophenylthioacetamido)penicillanic acid,
6-(α-3-trifluoromethylthylphenylthioacetamido) penicillanic acid,
6-(α-parabromophenylthioacetamido)penicillanic acid,
6-(α-paraphenylphenylthioacetamido)penicillanic acid,
6-(α-4-methoxyphenylthioacetamido)penicillanic acid,
6-(α-4-cyclohexylphenylthioacetamido)penicillanic acid,
6-(α-2,4-dichlorophenylthioacetamido)penicillanic acid,
6-(α-2,4-diisoamylphenylthioacetamido)penicillanic acid,
6-(α-4-benzylphenylthioacetamido)penicillanic acid,
6-(α-4-sulfamylphenylthioacetamido)penicillanic acid,
6-(α-2-allyloxyphenylthioacetamido)penicillanic acid,
6-(α-4-allylphenylthioacetamido)penicillanic acid,
6-(α-4-dimethylaminophenylthioacetamido)penicillanic acid,
6-(α-2-5-dichlorophenylthioacetamido)penicillanic acid,
6-(α-2-iodophenylthioacetamido)penicillanic acid,
6-(α-2-acetamidophenylthioacetamido)penicillanic acid,
6-(α-4-diethylaminophenylthioacetamido)penicillanic acid, and
6-(α-3-fluorophenylthioacetamido)penicillanic acid,
to produce
bis(6-α-phenylthioacetamidopenicillanyl)disulfide,
bis(6-α-paranitrophenylthioacetamidopenicillanyl) disulfide,
bis-(6-α-parachlorophenylthioacetamidopenicillanyl) disulfide,
bis(6-α-4-t-butylphenylthioacetamidopenicillanyl) disulfide,
bis(6-α-ortho-tolylthioacetamidopenicillanyl) disulfide,
bis(6-α-ortho-nitrophenylthioacetamidopenicillanyl) disulfide,
bis(6-α-3,4,5-trichlorophenylthioacetamidopenicillanyl) disulfide,
bis(6-α-3-trifluoromethylphenylthioacetamidopenicillanyl)disulfide,
bis(6-α-parabromophenylthioacetamidopenicillanyl) disulfide,
bis(6-α-paraphenylphenylthioacetamidopenicillanyl) disulfide,
bis(6-α-4-methoxyphenylthioacetamidopenicillanyl) disulfide,
bis(6-α-4-cyclohexylphenylthioacetamidopenicillanyl) disulfide,
bis(6-α-2,4-dichlorophenylthioacetamidopenicillanyl) disulfide,
bis(6-α-2,4-diisoamylphenylthioacetamidopenicillanyl)disulfide,
bis(6-α-4-benzylphenylthioacetamidopenicillanyl) disulfide,
bis(6-α-4-sulfamylphenylthioacetamidopenicillanyl) disulfide,
bis(6-α-2-allyloxyphenylthioacetamidopenicillanyl) disulfide,
bis(6-α-4-allylphenylthioacetamidopenicillanyl) disulfide,
bis(6-α-4-dimethylaminophenylthioacetamidopenicillanyl)disulfide,
bis(6-α-2,5-dichlorophenylthioacetamidopenicillanyl)disulfide,
bis(6-α-2-iodophenylthioacetamidopenicillanyl) disulfide,
bis(6-α-2-acetamidophenylthioacetamidopenicillanyl) disulfide,
bis(6-α-4-diethylaminophenylthioacetamidopenicillanyl)disulfide, and
bis(6-α-3-fluorophenylthioacetamidopenicillanyl) disulfide, respectively, each of which is found to inhibit *Staph. aureus* Smith at concentrations of 0.001 percent by weight.

EXAMPLE 14

In the procedure of Example 2, the 6-(α-tritylaminophenylacetamido)penicillanic acid is replaced by 0.01 mole of
6-(benzoylureido)penicillanic acid,
6-(n-propylureido)penicillanic acid,
6-(n-hexylureido)penicillanic acid,
6-(n-octadecylureido)penicillanic acid,
6-(cyclohexylureido)penicillanic acid,
6-(p-chlorophenylureido)penicillanic acid,
6-(m-methoxyphenylureido)penicillanic acid,
6-(benzylureido)penicillanic acid,
6-(cyclopentylureido)penicillanic acid,
6-(p-tolylureido)penicillanic acid,
6-(p-dimethylaminophenylureido)penicillanic acid,
6-(phenylureido)penicillanic acid,
6-(2-methylphenylureido)penicillanic acid,
6-(methylureido)penicillanic acid,
6-(2-nitrophenylureido)penicillanic acid,
6-(benzoylureido)penicillanic acid,
6-(4'-nitrobenzoylureido)penicillanic acid,
6-(2'-chlorobenzoylureido)penicillanic acid,
6-(2'-methylbenzoylureido)penicillanic acid,
6-(3',4',5'-trimethoxybenzoylureido) penicillanic acid,
6-(4'-methylbenzoylureido)penicillanic acid,
6-(4'-chlorobenzoylureido)penicillanic acid,
6-(3',4'-dichlorobenzoylureido)penicillanic acid,
6-(3'-nitrobenzoylureido)penicillanic acid,
6-(2',4',6'-trimethoxybenzoylureido)penicillanic acid,
6-(4'-ethoxybenzoylureido(penicillanic acid,
6-(2',6'-dimethoxybenzoylureido)penicillanic acid,
6-(2',4',6'-trimethylbenzoylureido)penicillanic acid,
6-(2',6'-dichlorobenzoylureido)penicillanic acid,
6-(2',6'-diethoxybenzoylureido)penicillanic acid,
6-(2',6'-di-n-butoxybenzoylureido)penicillanic acid,
6-(2',3',6'-trimethoxybenzoylureido)penicillanic acid,
6-(2',4',6'-tribromobenzoylureido)penicillanic acid,
6-(2',6'-di-n-propoxybenzoylureido)penicillanic acid,
6-(2',6'-dimethoxy-4'-methylbenzoylureido) penicillanic acid,
6-(4',6'-diethyl-2'-methoxybenzoylureido)penicillanic acid,
6-(2'-ethoxy-6'-methoxybenzoylureido)penicillanic acid,
6-(2'-phenylbenzoylureido)penicillanic acid,
6-(2'-methoxybenzoylureido)penicillanic acid,
6-(2',6'-dimethylbenzoylureido)penicillanic acid,
6-(2'-chloro-6'-methylbenzoylureido)penicillanic acid,
6-(2',6'-dimethoxy-3'-nitrobenzoylureido)penicillanic acid,
6-(3',5'-dichloro-2',6'-dimethoxybenzoylureido) penicillanic acid,
6-(3',5'-dibromo-2',6'-dimethoxybenzoylureido) penicillanic acid,
6-(3'-bromo-2',6'-dimethoxybenzoylureido) penicillanic acid,
6-(3'-chloro-2',6'-dimethoxybenzoylureido) penicillanic acid,
6-(3',5'-diiodo-2',6'-dimethoxybenzoylureido) penicillanic acid,
6-(3'-iodo-2',6'-dimethoxybenzoylureido) penicillanic acid,
6-(4'-trifluoromethylbenzoylureido)penicillanic acid,
6-(4'-isopropylbenzoylureido)penicillanic acid and
6-(4'-iodobenzoylureido)penicillanic acid,
respectively, to produce
bis(6-benzoylureidopenicillanyl)disulfide,
bis(6-n-propylureidopenicillanyl)disulfide,
bis(6-n-hexylureidopenicillanyl)disulfide,
bis(6-n-octadecylureidopenicillanyl)disulfide,
bis(6-cyclohexylureidopenicillanyl)disulfide,
bis(6-p-chlorophenylureidopenicillanyl)disulfide,
bis(6-m-methoxyphenylureidopenicillanyl)disulfide,
bis(6-benzylureidopenicillanyl)disulfide,
bis(6-cyclopentylureidopenicillanyl)disulphide,
bis(6-p-tolylureidopenicillanyl)disulfide,
bis(6-p-dimethylaminophenylureidopenicillanyl) disulfide,
bis(6-phenylureidopenicillanyl)disulfide,
bis(6-2-methylphenylureidopenicillanyl)disulfide,
bis(6-methylureidopenicillanyl)disulfide,
bis(6-2-nitrophenylureidopenicillayl)disulfide,
bis(6-benzoylureidopenicillanyl)disulfide,
bis(6-4'-nitrobenzoylureidopenicillanyl)disulfide,
bis(6-2'-chlorobenzoylureidopenicillanyl)disulfide,
bis(6-2'-methylbenzoylureidopenicillanyl)disulfide,
bis(6-3',4',5'-trimethoxybenzoylureidopenicillanyl) disulfide,
bis(6-4'-methylbenzoylureidopenicillanyl)disulfide,
bis(6-4'-chlorobenzoylureidopenicillanyl)disulfide,
bis(6-3',4'-dichlorobenzoylureidopenicillanyl) disulfide,
bis(6-3'-nitrobenzoylureidopenicillanyl)disulfide,
bis(6-2',4',6'-trimethoxybenzoylureidopenicillanyl) disulfide,
bis(6-4'-ethoxybenzoylureidopenicillanyl)disulfide,
bis(6-2',6'-dimethoxybenzoylureidopenicillanyl) disulfide,
bis(6-2',4'6'-trimethylbenzoylureidopenicillanyl) disulfide,
bis(6-2',6'-dichlorobenzoylureidopenicillanyl) disulfide,
bis(6-2',6'-diethoxybenzoylureidopenicillanyl)disulfide,
bis(6-2',6'-di-n-butoxybenzoylureidopenicillanyl) disulfide,
bis(6-2',3',6'-trimethoxybenzoylureidopenicillanyl) disulfide,
bis(6-2',4',6'-tribromobenzoylureidopenicillanyl) disulfide,
bis(6-2',6'-di-n-propoxybenzoylureidopenicillanyl) disulfide,
bis(6-2',6'-dimethoxy-4'-methylbenzoylureidopenicillanyl)disulfide,
bis(6-4',6'-diethyl-2'-methoxybenzoylureidopenicillanyl)disulfide,
bis(6-2'-ethoxy-6'-methoxybenzoylureidopenicillanyl)disulfide,
bis(6-2'-phenylbenzoxylureidopenicillanyl)disulfide,
bis(6-2'-methoxybenozylureidopenicillanyl)disulfide,
bis(6-2',6'-dimethylbenzoylureidopenicillanyl) disulfide,
bis(6-2'-chloro-6'-methylbenzoylureidopenicillanyl) disulfide,
bis(6-2',6'-dimethoxy-3'-nitrobenzoylureidopenicillanyl) disulfide,
bis(6-3',5'-dichloro-2',6'-dimethoxybenzoylureidopenicillanyl)disulfide,
bis(6-3',5'-dibromo-2',6'-dimethoxylbenzoylureidopenicillanyl)disulfide,
bis(6-3'-bromo-2',6'-dimethoxybenzoylureidopenicillanyl)disulfide,
bis(6-3'-chloro-2',6'-dimethoxybenzoylureidopenicillanyl)disulfide,
bis(6-3',5'-diiodo-2',6'-dimethoxybenzoylureidopenicillanyl)disulfide,
bis(6-3'-iodo-2',6'-dimethoxybenzoylureidopenicillanyl)disulfide,
bis(6-4'-trifluoromethylbenzoylureidopenicillanyl) disulfide,
bis(6-4'-isopropylbenozylureidopenicillanyl) disulfide, and
bis(6-4'-idodbenozylueridopenicillanyl)disulfide, respectively, each of which is found to contain the β-lactam ring structure as shown by infrared analysis and to inhibit Gram-positive bacteria, e.g., *Staph. aureus* Smith at concentrations of 0.001 percent by weight.

EXAMPLE 15

In the procedure of Example 2, the 6-(α-tritylaminophenylacetamido)penicillanic acid is replaced by 0.01 mole of 6-(phenylacetamido)penicillanic acid,
6-(3-chlorophenylacetamido)penicillanic acid,
6-(2,6-dimethylphenylacetamido)penicillanic acid,
6-(4-trifluoromethylphenylacetamido)penicillanic acid,
6-(3-nitrophenylacetamido)penicillanic acid,
6-(4-isopropylphenylacetamido)penicillanic acid,
6-(2-bromophenylacetamido)penicillanic acid,
6-(4-iodophenylacetamido)penicillanic acid,
6-(3-acetamidophenylacetamido)penicillanic acid,
6-(2,4-dichlorophenylacetamido)penicillanic acid,
6-(3-sulfamylphenylacetamido)penicillanic acid,
6-(2-methylthiophenylacetamido)penicillanic acid,
6-(4-methoxyphenylacetamido)penicillanic acid,
6-(4-methylphenylacetamido)penicillanic acid,
6-(2-diethylaminophenylacetamido)penicillanic acid,
6-(4-cyclohexylphenylacetamido)penicillanic acid,
6-(3-phenoxyphenylacetamido)penicillanic acid,
6-(2-benzylphenylacetamido)penicillanic acid,
6-(2-fluorophenylacetamido)penicillanic acid,
6-(2-methyl-4-chlorophenylacetamido)penicillanic acid,
6-[4-(4-chlorophenyl)phenylacetamido]penicillanic acid and
6-(2,6-dimethoxyphenylacetamido)penicillanic acid, respectively,
to produce bis(6-phenylacetamidopenicillanyl)disulfide,
bis(6-3-chlorophenylacetamidopenicillanyl)disulfide,
bis(6-2,6-dimethylphenylacetamidopenicillanyl) disulfide,
bis(6-4-trifluoromethylphenylacetamidopenicillanyl) disurlfide,
bis(6-3-nitrophenylacetamidopenicillanyl)disulfide,
bis(6-4-isopropylphenylacetamidopenicillanyl)disulfide,
bis(6-2-bromophenylacetamidopenicillanyl)disulfide,
bis(6-4-iodophenylacetamidopenicillanyl)disulfide,
bis(6-3-acetamidophenylacetamidopenicillayl)disulfide,
bis(6-2,4-dichlorophenylacetamidopenicillanyl)disulfide,
bis(6-3-sulfamylphenylacetamidopenicillanyl)disulfide,
bis(6-2-methylthiophenylacetamidopenicillanyl) disulfide,
bis(6-4-methoxyphenylacetamidopenicillanyl)disulfide,
bis(6-4-methylphenylacetamidopenicillanyl)disulfide,
bis(6-2-diethylaminophenylacetamidopenicillanyl) disulfide,
bis(6-4-cyclohexylphenylacetamidopenicillanyl) disulfide,
bis(6-3-phenoxyphenylacetamidopenicillanyl)disulfide,
bis(6-2-benzylphenylacetamidopenicillanyl)disulfide,
bis(6-2-fluorophenylacetamidopenicillanyl)disulfide,
bis(6-2-methyl-4-chlorophenylacetamidopenicillanyl) disulfide,
bis[6-4-(4-chlorophenyl)phenylacetamidopenicillanyl] disulfide and
bis(6-2,6-dimethoxyphenylacetamidopenicillanyl) disulfide, respectively,
each of which is found to inhibit *Staph. aureus* Smith at concentrations of 0.001 percent by weight.

EXAMPLE 16

In the procedure of Example 2, the 6-(α-tritylaminophenylacetamido)penicillanic acid is replaced by 0.01 mole of
d,L-6-(α-amino-3-thienylacetamido)penicillanic acid,
d,L-6-(α-amino-2-thienylacetamido)penicillanic acid.
6-(α-amino-5-ethyl-2-thienylacetamido)penicillanic acid,
6-(α-amino-5-methyl-2-thienylacetamido)penicillanic acid,
6-(α-amino-5-t-butyl-2-thienylacetamido)penicillanic acid,
6-(α-amino-2,5-dimethyl-3-thienylacetamido)penicillanic acid,
6-(α-amino-5-chloro-2-thienylacetamido)penicillanic acid,
6-(α-amino-5-phenyl-3-chloro-2-thienylacetamido)-penicillanic acid,
6-(α-amino-3,5-dimethyl-2-thienylacetamido)penicillanic acid,
6-(α-amino-5-cyclohexyl-2-thienylacetamido)penicillanic acid,
6-(α-amino-5-diethylamino-2-thienylacetamido)penicillanic acid,
6-(α-amino-4-methylsulfonyl-2-thienylacetamido)penicillanic acid,
6-(α-amino-3-ethylthio-2-thienylacetamido)penicillanic acid,
6-(α-amino-4-cycloheptyloxy-2-thienylacetamido)penicillanic acid, to produce,
bis(d,L-6-α-amino-3-thienylacetamidopenicillanyl)-disulfide,
bis(d,L-6-α-amino-2-thienylacetamidopenicillanyl)-disulfide,
bis(6-α-amino-5-ethyl-2-thienylacetamidopenicillanyl)-disulfide,
bis(6-α-amino-5-methyl-2-thienylacetamidopenicillanyl)-disulfide,
bis(6-α-amino-5-t-butyl-2-thienylacetamidopenicillanyl)-disulfide,
bis(6-α-amino-2,5-dimethyl-3-thienylacetamidopenicillanyl)-disulfide
bis(6-α-amino-5-chloro-2-thienylacetamidopenicillanyl)-disulfide,
bis(6-α-amino-5-phenyl-3-chloro-2-thienylacetamidopenicillanyl)disulfide,
bis(6-α-amino-3,5-dimethyl-2-thienylacetamidopenicillanyl)disulfide,
bis(6-α-amino-5-cyclohexyl-2-thienylacetamidopenicillanyl)-disulfide,
bis(6-α-amino-5-diethylamino-2-thienylacetamidopenicillanyl)disulfide,
bis(6-α-amino-4-methylsulfonyl-2-thienylacetamidopenicillanyl)disulfide,
bis(6-α-amino-3-ethylthio-2-thienylacetamidopenicillanyl)disulfide, and
bis(6-α-amino-4-cycloheptyloxy-2-thienylacetamidopenicillanyl)disulfide,
respectively, each of which is found to inhibit *Staph. aureus* Smith at concentrations of 0.001 percent by weight.

EXAMPLE 17

In the procedure of Example 2, the 6-(α-tritylaminophenylacetamido)penicillanic acid is replaced by 0.01 mole of
6-(α-aminophenylacetamido)penicillanic acid,
6-(α-amino-p-chlorophenylacetamido)penicillanic acid,
6-(α-amino-p-methoxyphenylacetamido)penicillanic acid,
6-[L-(+)-α-aminophenylacetamido]penicillanic acid,
6-(α-amino-4-diethylaminophenylacetamido)penicillanic acid,
6-(α-amino-4-trifluoromethylphenylacetamido)penicillanic acid,
6-(α-amino-2,4-dibromophenylacetamido)penicillanic acid,
6-(α-amino-2-nitrophenylacetamido)penicillanic acid,
6-(α-amino-3-methylphenylacetamido)penicillanic acid,
6-(α-amino-4-sulfamylphenylacetamido)penicillanic acid,
6-(α-amino-2-iodophenylacetamido)penicillanic acid,
6-(α-amino-4-t-butylphenylacetamido)penicillanic acid,
6-(α-amino-2-acetamidophenylacetamido)penicillanic acid,
6-(α-amino-3-nitrophenylacetamido)penicillanic acid,
6-(α-amino-3,4-dimethoxyphenylacetamido)penicillanic acid,
6-(α-amino-4-dimethylaminophenylacetamido)penicillanic acid,
6-(α-amino-2,4-dichlorophenylacetamido)penicillanic acid,
6-(α-amino-4-isopropylphenylacetamido)penicillanic acid,
6-(α-amino-3-bromophenylacetamido)penicillanic acid, 6-(α-amino-4-iodophenylacetamido)penicillanic acid,
6-(α-amino-2-diethylaminophenylacetamido)penicillanic acid,
6-(α-amino-2-trifluoromethylphenylacetamido)penicillanic acid,
6-(α-amino-4-fluorophenylacetamido)penicillanic acid,
6-(α-amino-3,4,5-trifluoromethylphenylacetamido)penicillanic acid, to produce
bis(6-α-aminophenylacetamidopenicillanyl)disulfide,
bis(6-α-amino-p-chlorophenylacetamidopenicillanyl)disulfide,
bis(6-α-amino-p-methoxyphenylacetamidopenicillanyl)disulfide,
bis[6-L-(+)-α-aminophenylacetamidopenicillanyl]disulfide,
bis(6-α-amino-4-diethylaminophenylacetamidopenicillanyl)disulfide,
bis(6-α-amino-4-trifluoromethylphenylacetamidopenicillanyl)disulfide,
bis(6-α-amino-2,4-dibromophenylacetamidopenicillanyl)disulfide,
bis(6-α-amino-2-nitrophenylacetamidopenicillanyl)disulfide,
bis(6-α-amino-3-methylphenylacetamidopenicillanyl)disulfide,
bis(6-α-amino-4-sulfamylphenylacetamidopenicillanyl)disulfide,
bis(6-α-amino-2-iodophenylacetamidopenicillanyl)disulfide,
bis(6-α-amino-4-t-butylphenylacetamidopenicillanyl)disulfide,
bis(6-α-amino-2-acetamidophenylacetamidopenicillanyl)disulfide,
bis(6-α-amino-3-nitrophenylacetamidopenicillanyl)disulfide,
bis(6-α-amino-3,4-dimethoxyphenylacetamidopenicillanyl)disulfide,
bis(6-α-amino-4-dimethylaminophenylacetamidopenicillanyl)disulfide,
bis(6-α-amino-2,4-dichlorophenylacetamidopenicillanyl)disulfide,
bis(6-α-amino-4-isopropylphenylacetamidopenicillanyl)disulfide,
bis(6-α-amino-3-bromophenylacetamidopenicillanyl)disulfide,
bis(6-α-amino-4-iodophenylacetamidopenicillanyl)disulfide,
bis(6-α-amino-2-diethylaminophenylacetamidopenicillanyl)disulfide,
bis(6-α-amino-2-trifluoromethylphenylacetamidopenicillanyl)disulfide,
bis(6-α-amino-4-fluorophenylacetamidopenicillanyl)disulfide,
bis(6-α-amino-3,4,5-trifluoromethylphenylacetamidopenicillanyl)disulfide, respectively, each of which is found to inhibit *Staph. aureus* Smith at concentrations of 0.001 percent by weight.

EXAMPLE 18

In the procedure of Example 2, the 6-(α-tritylaminophenylacetamido)penicillanic acid is replaced by 0.01 mole of 6-(α-amino-1-naphthylacetamido)penicillanic acid,
6-(α-amino-2-naphthylacetamido)penicillanic acid,
6-(α-amino-1-chloro-2-naphthylacetamido)penicillanic acid,
6-(α-amino-2-methyl-7-naphthylacetamido)penicillanic acid,
6-(α-amino-6-nitro-1-naphthylacetamido)penicillanic acid,
6-(α-amino-2,7-dibromo-3-naphthylacetamido)penicillanic acid,
6-(α-amino-4-trifluoromethyl-1-naphthylacetamido)penicillanic acid,
6-(α-amino-8-iodo-1-naphthylacetamido)penicillanic acid,
6-(α-amino-1-methoxy-2-naphthylacetamido)penicillanic acid and
6-(α-amino-4-acetamido-1-naphthylacetamido)penicillanic acid, to produce
bis(6-α-amino-1-naphthylacetamidopenicillanyl)disulfide,
bis(6-α-amino-2-naphthylacetamidopenicillanyl)disulfide,
bis(6-α-amino-1-chloro-2-naphthylacetamidopenicillanyl)disulfide,
bis(6-α-amino-2-methyl-7-naphthylacetamidopenicillanyl)disulfide,
bis(6-α-amino-6-nitro-1-naphthylacetamidopenicillanyl)disulfide,
bis(6-α-amino-2,7-dibromo-3-naphthylacetamidopenicillanyl)disulfide,
bis(6-α-amino-4-trifluoromethyl-1-naphthylacetamidopenicillanyl)disulfide,
bis(6-α-amino-8-iodo-1-naphthylacetamidopenicillanyl)disulfide,
bis(6-α-amino-1-methoxy-2-naphthylacetamidopenicillanyl)disulfide, and
bis(6-α-amino-4-acetamido-1-naphthylacetamidopenicillanyl)disulfide, respectively, each of which is found to inhibit *Staph. aureus* Smith at concentrations of 0.001 percent by weight.

I claim:
1. A compound of the formula

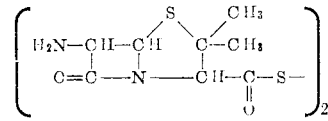

2. Compounds having the formula

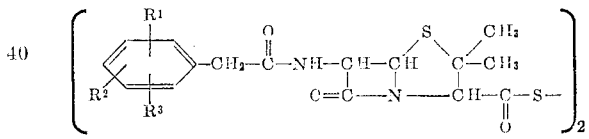

wherein $R^1$, $R^2$ and $R^3$ are each a member selected from the group consisting of hydrogen, chloro, bromo, fluoro, iodo, nitro, sulfamyl, trifluoromethyl, (lower)alkyl, (lower)alkoxy, (lower)alkylthio, di(lower)akylamino, (lower)alkanolylamino, (lower)-alkanoyl, (lower)alkylsulfonyl, cycloalkyl raicals having from 5 to 7 carbon atoms inclusive, cycloalkoxy radicals having from 5 to 7 carbon atoms inclusive, phenyl, phenoxy and benzyl.

3. Compounds having the formula

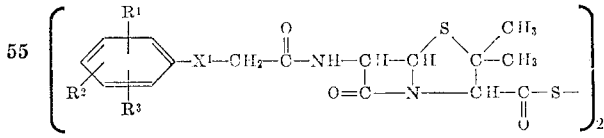

wherein $R^1$, $R^2$ and $R^3$ are each a member selected from the group consisting of hydrogen, chloro, bromo, fluoro, iodo, nitro, sulfamyl, trifluoromethyl, (lower)alkyl, (lower)alkoxy, (lower)alkylthio, di(lower)alkylamino, (lower)alkanoylamino, (lower)alkanoyl, (lower)alkylsulfonyl, cycloalkyl radicals having from 5 to 7 carbon atoms inclusive, cycloalkoxy radicals having from 5 to 7 carbon atoms inclusive, phenyl, phenoxy and benzyl, and wherein $X^1$ is a member selected from the group consisting of sulfur and oxygen.

4. Compounds having the formula

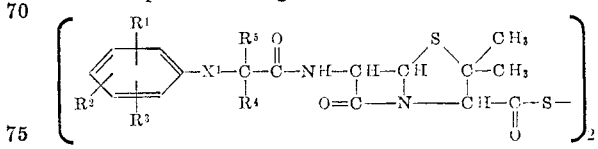

wherein $R^1$, $R^2$ and $R^3$ are each a member selected from the group consisting of hydrogen, chloro, bromo, fluoro, iodo, nitro, sulfamyl, trifluoromethyl, (lower)alkyl, (lower)alkoxy, (lower)alkylthio, di(lower)alkylamino, (lower) alkanoylamino, (lower)alkanoyl, (lower)alkylsulfonyl, cycloalkyl radicals having from 5 to 7 carbon atoms inclusive, cycloalkoxy radicals having from 5 to 7 carbon atoms inclusive, phenyl, phenoxy and benzyl, wherein $X^1$ is a member selected from the group consisting of sulfur and oxygen, and wherein $R^4$ is a member selected from the group consisting of (lower)alkyl, phenyl and phenyl(lower)alkyl, and wherein $R^5$ represents hydrogen, (lower)alkyl, phenyl and phenyl(lower)alkyl.

5. A compound selected from the group consisting of compounds having the formula

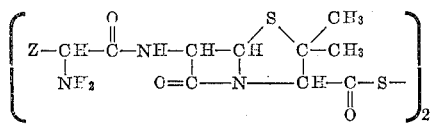

wherein Z is a member selected from the group consisting of radicals of the formulae

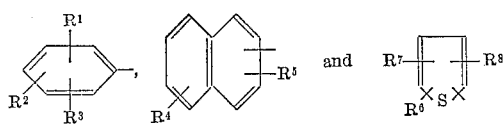

wherein $R^1$, $R^2$ and $R^3$ are each a member selected from the group consisting of hydrogen, chloro, bromo, fluoro, iodo, nitro, sulfamyl, trifluoromethyl, (lower)alkyl, (lower)alkoxy, (lower)alkylthio, di(lower)alkylamino, (lower)alkanoylamino, (lower)alkanoyl, (lower)alkanoyl, (lower)alkanonyloxy, (lower)alkylsulfonyl, phenyl and benzyl, wherein $R^4$ and $R^5$ are each a member selected from the group consistnig of hydrogen, chloro, bromo, fluoro, iodo, nitro, (lower)alkoxy, phenoxy, benzyloxy, trifluoromethyl, (lower)alkanoylamino and (lower)alkyl, and wherein $R^6$, $R^7$ and $R^8$ are each a member selected from the group consisting of hydrogen, chloro, bromo, fluoro, iodo, nitro, (lower)alkyl, (lower)alkoxy, phenyl, phenoxy, benzyloxy, (lower)alkylthio, di(lower)-alkylamino, (lower)alkanoylamino, (lower)alkanoyl, (lower) alkylsulfonyl, and the pharmaceutically acceptable nontoxic salts thereof.

6. Compounds having the formula

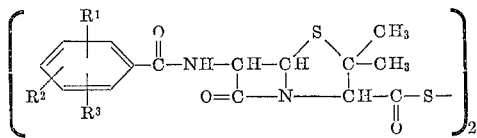

wherein $R^1$, $R^2$ and $R^3$ are each a member selected from the group consisting of hydrogen, chloro, bromo, fluoro, iodo, nitro, sulfamyl, trifluoromethyl (lower)alkyl, (lower)alkoxy, (lower)alkylthio, di(lower)alkylamino, (lower)alkanoylamino, (lower)alkanoyl, (lower)alkylsulfonyl, cycloalkyl radicals having from 5 to 7 carbon atoms inclusive, cycloalkoxy radicals having from 5 to 7 carbon atoms inclusive, phenyl, phenoxy and benzyl.

7. Compounds having the formula

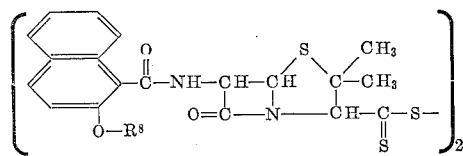

wherein $R^8$ is (lower)alkyl.

8. Compounds having the formula

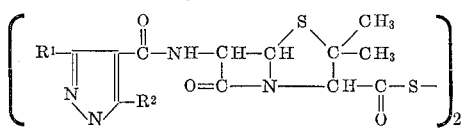

wherein $R^1$ and $R^2$ are each a member selected from the group consisting of (lower)alkyl, (lower)alkoxy, (lower)alkylthio, cyclopentyl, cyclohexyl, benzyl, phenoxy and radicals of the formula

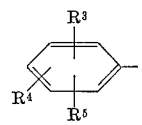

wherein $R^3$, $R^4$ and $R^5$ are each a member selected from the group consisting of hydrogen, chloro, bromo, fluoro, iodo, nitro, cyano, (lower)alkyl, (lower)alkoxy, (lower)alkylthio, di(lower)alkylamino, (lower)alkanoylamino, (lower)alkanoyl, (lower)alkylsulfonyl, phenyl, benzyl, phenethyl and trifluoromethyl.

9. Compounds having the formula

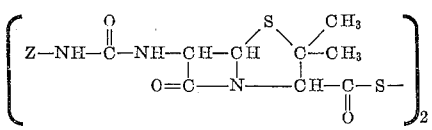

where Z represents a member selected from the group consisting of (lower)alkyl, cycloalkyl radicals having from 5 to 7 carbon atoms inclusive, and radicals of the formulae

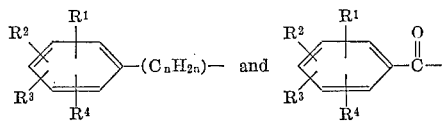

wherein $n$ is a whole integer from 0 to 6 inclusive, wherein $R^1$, $R^2$, $R^3$ and $R^4$ are each a member selected from the group consisting of hydrogen, chloro, bromo, fluoro, iodo, nitro, sulfamyl, trifluoromethyl, (lower)alkyl, (lower)alkoxy, (lower)alkylthio, di(lower)alkylamino, (lower)alkanoylamino, (lower)alkanoyl, (lower)alkylsulfonyl, cycloalkyl radicals having from 5 to 7 carbon atoms inclusive, cycloalkoxy radicals having from 5 to 7 carbon atoms inclusive, phenyl, phenoxy and benzyl.

10. Bis(6-phenylacetamidopenicillanyl)disulfide.
11. Bis(6-phenoxyacetamidopenicillanyl)disulfide.
12. Bis(6-α - phenoxypropionamidopenicillanyl)disulfide.
13. Bis(6 - α - phenoxy-n-butyramidopenicillanyl)disulfide.
14. Bis(6 - 2,6 - dimethoxybenzamidopenicillanyl)disulfide.
15. Bis(6-3-phenyl-5-methyl-4 - isoxazolylcarboxamidopenicillanyl)disulfide.
16. Bis[6-3-(o-chlorophenyl)-5-methyl - 4 - isoxazolylcarboxamidopenicillanyl]disulfide.
17. Bis(6-2-ethoxy-1 - naphthamidopenicillanyl)disulfide.
18. Bis(6-2-biphenylcarboxamidopenicillanyl)disulfide.
19. Bis[6 - 2 - (N - t - butylphthalamido)penicillanyl]disulfide.
20. Bis(6-α - aminophenylacetamidopenicillanyl)disulfide.

No references cited.

ALEX MAZEL, Primary Examiner.

HENRY R. JILES, Examiner.

J. W. ADAMS, Assistant Examiner.